US011350065B2

(12) United States Patent
Kawabe

(10) Patent No.: US 11,350,065 B2
(45) Date of Patent: May 31, 2022

(54) VIDEO GENERATION DEVICE, VIDEO GENERATION METHOD, AND PROGRAM

(71) Applicant: NIPPON TELEGRAPH AND TELEPHONE CORPORATION, Tokyo (JP)

(72) Inventor: Takahiro Kawabe, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/049,652

(22) PCT Filed: Apr. 4, 2019

(86) PCT No.: PCT/JP2019/014948
§ 371 (c)(1),
(2) Date: Oct. 22, 2020

(87) PCT Pub. No.: WO2019/208143
PCT Pub. Date: Oct. 31, 2019

(65) Prior Publication Data
US 2021/0258547 A1    Aug. 19, 2021

(30) Foreign Application Priority Data

Apr. 24, 2018    (JP) .............................. JP2018-083179

(51) Int. Cl.
*H04N 9/31* (2006.01)
*G03B 21/14* (2006.01)
(Continued)

(52) U.S. Cl.
CPC ......... *H04N 9/3185* (2013.01); *G03B 21/147* (2013.01); *G03B 25/00* (2013.01); *H04N 9/3182* (2013.01); *H04N 9/74* (2013.01)

(58) Field of Classification Search
CPC .......... H04N 9/74; H04N 9/315; H04N 9/793; H04N 9/3102; H04N 9/3108;
(Continued)

(56) References Cited

U.S. PATENT DOCUMENTS 11,178,064 B2 *  11/2021  Kobayashi .............. H04L 47/70
2009/0201320 A1 *  8/2009  Damberg ............. G09G 3/3426
345/694
(Continued)

FOREIGN PATENT DOCUMENTS

JP          6069115 B2    1/2017

*Primary Examiner* — Sultan Chowdhury

(57) ABSTRACT

Using different deformation maps that have elements corresponding to respective pixels deriving from an original image and have low-spatial frequency components, the elements indicating a moving direction and a moving amount of the corresponding pixels, the pixels deriving from the original image are moved in a moving direction by a moving amount, the moving direction and the moving amount being specified by the elements corresponding to the respective pixels, and modulated images are obtained. The modulated images are separated into brightness components and color components to obtain brightness component images and color component images, brightness of brightness component images and/or color of color component images is modulated to obtain brightness-modulated image and/or color-modulated image, and a video is obtained, the video being configured by arranging integrated images obtained by integrating the obtained brightness-modulated images and/or color-modulated images.

11 Claims, 11 Drawing Sheets

(51) Int. Cl.
*G03B 25/00* (2006.01)
*H04N 9/74* (2006.01)

(58) Field of Classification Search
CPC .. H04N 9/3179; H04N 9/3182; H04N 9/3185; H04N 13/30; H04N 13/31; H04N 13/268; H04N 13/324; H04N 13/337; H04N 13/356; H04N 13/398; G03B 21/006; G03B 21/008; G03B 21/28; G03B 21/147; G03B 21/208; G03B 21/2053; G03B 25/00; G03B 25/02
See application file for complete search history.

(56) References Cited

U.S. PATENT DOCUMENTS

| | | | |
|---|---|---|---|
| 2012/0188368 A1* | 7/2012 | Shechtman | H04N 5/232411 348/135 |
| 2017/0045813 A1* | 2/2017 | Kawabe | G03B 21/32 |
| 2019/0208186 A1* | 7/2019 | Kawabe | H04N 13/356 |

* cited by examiner

VIDEO GENERATION DEVICE, VIDEO GENERATION METHOD, AND PROGRAM

CROSS-REFERENCE TO RELATED APPLICATIONS

This application is a U.S. 371 Application of International Patent Application No. PCT/JP2019/014948, filed on 4 Apr. 2019, which application claims priority to and the benefit of JP Application No. 2018-083179, filed on 24 Apr. 2018, the disclosures of which are hereby incorporated herein by reference in their entireties.

TECHNICAL FIELD

The present invention relates to a technology for giving an visual illusion, and particularly to a technology for causing a visual perception of a transparent or translucent material.

BACKGROUND ART

Commonly, when a perception of a non-rigid, transparent or translucent material (which will be referred to as "a transparent material perception") is to be provided to an image, modeling, ray calculation, physical calculation, and rendering for this material is performed using CG software and a language dedicated to graphics, such as OpenGL. However, use of such a technology requires some degree of knowledge, and it is not very easy for a user who has not learned the knowledge to use this method.

Meanwhile, there is also a method of providing an image with a transparent material perception, only using simple image processing. Commonly, the refractive index of a transparent or translucent material is 1 or more. Thus, a scene on the background of a transparent or translucent material distorts. The technology described in Patent Literature 1 expresses this distortion using image processing, and gives an observer the illusion that an object with a transparent material perception is present between an image and the observer.

CITATION LIST

Patent Literature

[Patent Literature 1] Japanese Patent No. 6069115

SUMMARY OF THE INVENTION

Technical Problem

However, a technology for independently operating color and lightness of a transparent material perception to be provided to an image using simple image processing techniques has not been proposed. For example, although Patent Literature 1 proposes a technology for providing a transparent material perception to an image, but does not disclose a method for independently operating color and lightness of the transparent material perception. For example, the color and lightness of a transparent material can be changed using the aforementioned language dedicated to graphics, but a user is required to have certain knowledge as mentioned above.

The present invention has been made in view of the foregoing points, and an object of the present invention is to independently operate color and lightness of a transparent material perception to be provided to an image, using simple image processing techniques.

Means for Solving the Problem

Using a plurality of different deformation maps that have elements corresponding to respective pixels deriving from an original image and have low-spatial frequency components, the elements indicating a moving direction and a moving amount of the corresponding pixels, the pixels deriving from the original image are moved in a moving direction by a moving amount, the moving direction and the moving amount being specified by the elements corresponding to the respective pixels, to obtain a plurality of modulated images. The plurality of modulated images are separated into brightness components and color components to obtain a plurality of brightness component images and color component images, brightness of the plurality of brightness component images and/or color of the plurality of color component images is modulated to obtain brightness-modulated image and/or color-modulated image, and a video is obtained, the video being configured by arranging a plurality of integrated images obtained by integrating the obtained brightness-modulated images and/or color-modulated images.

Effects of the Invention

Thus, the color and lightness of a transparent material perception to be provided to an image can be independently operated using simple image processing techniques.

DESCRIPTION OF EMBODIMENTS

Figure 1:
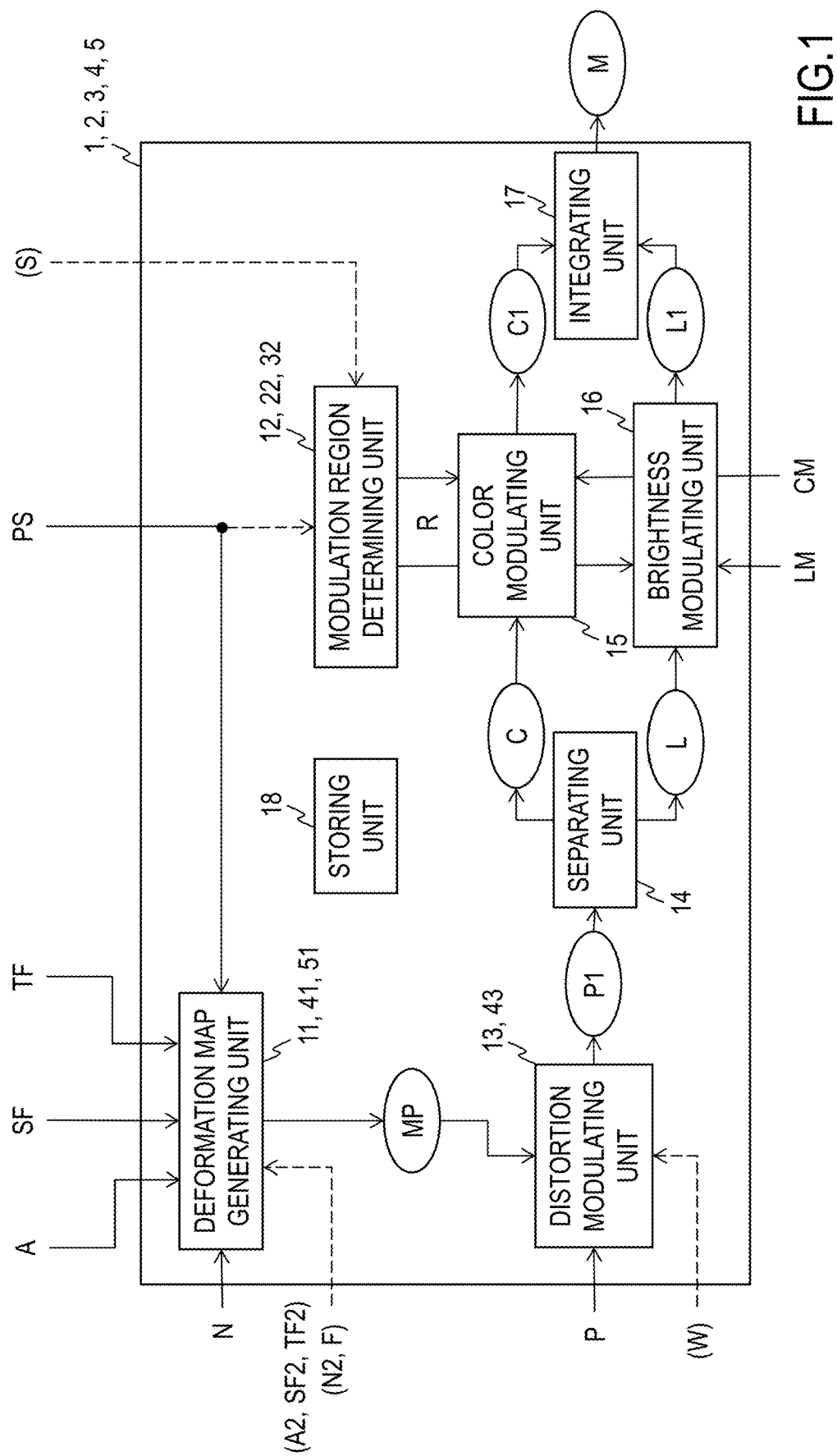
FIG. 1 is a block diagram showing an example of a functional configuration of a video generating device according to embodiments.

Hereinafter, embodiments of the present invention will be described with reference to the drawings.

SUMMARY

First, the summary of the embodiments will be described.

A video generating device for operating color, using a plurality of deformation maps (a plurality of different deformation maps that have elements corresponding to respective pixels deriving from an original image and have low-spatial frequency components, the elements indicating a moving direction and a moving amount of the respective pixels), moves the pixels deriving from the original image in a moving direction by a moving amount, the moving direction and the moving amount being specified by the elements corresponding to the respective pixels, obtains a plurality of modulated images, separates the plurality of modulated images into brightness components (lightness components) and color components to obtain a plurality of brightness component images and color component images, obtains a plurality of color-modulated images that are obtained by modulating (changing) color of the plurality of color component images in accordance with color modulation information, and obtains a video, which is configured by temporally arranging a plurality of integrated images obtained by integrating the brightness component images and the color-modulated images. An observer who sees this video is given the illusion that a substance with a transparent material perception that has the color corresponding to the color modulation information is disposed in a region between the original image and the observer. Generation of this video does not require complex image processing techniques.

A video generating device for operating lightness, using the aforementioned "deformation maps", moves the pixels deriving from the original image in a moving direction by a moving amount, the moving direction and the moving amount being specified by the elements corresponding to the respective pixels, obtains a plurality of modulated images, separates the plurality of modulated images into brightness components and color components to obtain a plurality of brightness component images and color component images, obtains a plurality of brightness-modulated images, which are obtained by modulating (changing) brightness of the plurality of brightness component images in accordance with brightness modulation information, and obtains a video, which is configured by temporally arranging a plurality of integrated images, which are obtained by integrating the brightness-modulated images and the color component images. An observer who sees this video is given the illusion that a substance with a transparent material perception that has the brightness (e.g. cloudiness) corresponding to the brightness modulation information is disposed in a region between the original image and the observer. Generation of this video does not require complex image processing techniques.

A video generating device for operating both color and brightness, using the aforementioned "deformation maps", moves the pixels deriving from the original image in a moving direction by a moving amount, the moving direction and the moving amount being specified by the elements corresponding to the respective pixels, obtains a plurality of modulated images, separates the plurality of modulated images into brightness components and color components to obtain a plurality of brightness component images and color component images, obtains a plurality of brightness-modulated images, which are obtained by modulating brightness of the plurality of brightness component images in accordance with brightness modulation information, obtains a plurality of color-modulated images, which are obtained by modulating color of the plurality of color component images in accordance with color modulation information, and obtains a video, which is configured by temporally arranging a plurality of integrated images obtained by integrating the brightness-modulated images and the color-modulated images. An observer who sees this video is given the illusion that a substance with a transparent material perception that has the color corresponding to the color modulation information and the brightness corresponding to the brightness modulation information is disposed in a region between the original image and the observer. Generation of this video does not require complex image processing techniques.

As described above, according to the embodiments, the embodiments make it possible to independently operate the color and lightness of a transparent material perception to be provided to an image, using simple image processing techniques. Note that, as mentioned above, the "transparent material perception" means a perception of a non-rigid, transparent or translucent material. An example of the "transparent material perception" is a perception of a transparent or translucent fluid such as a liquid or a gas.

The "original image" refers to a two-dimensional array constituted by any pixels. The "original image" may be an image obtained by shooting or drawing a substance that exists in the real space, or may express something that does not exist in the real space, or may be a noise image. Also, the "original image" may be a color image, or may be a monotone image, or may be a black and white image.

Each of the "deformation maps" is a two-dimensional distribution (distortion distribution) of values (distortion amounts) that express the amount by which the pixels deriving from the "original image" are to be distorted. The "deformation maps" are also called "distortion distributions". The "pixels deriving from the original image" may be pixels of the "original image", or may be pixels of an image obtained by moving the pixels of the "original image". An example of each of the "deformation maps" is a two-dimensional array of pixel values of the pixels (elements) that express the moving directions and the moving amounts of the respective pixels deriving from the original image. For example, the moving direction of each of the pixels deriving from the "original image" is expressed by the positive or negative sign of a pixel value of a pixel of the "deformation maps" that corresponds to the pixel deriving from the "original image", and the moving amount of each of the pixels deriving from the "original image" is expressed by the absolute value of a pixel value of a pixel of the "deformation maps" that corresponds to the pixel deriving from the "original image". For example, the position (coordinates) of each of the pixels deriving from the "original image" is the same as the position (coordinates) of a pixel of the "deformation maps" that expresses the moving direction and the moving amount of the pixel deriving from the "original image". If the moving direction of a pixel is expressed by the positive or negative sign of a pixel value thereof, only a one-dimensional direction can be specified. For this reason, to deform the pixels deriving from the "original image" in a two-dimensional direction, "deformation maps (horizontal-direction deformation maps)" for modulating the pixels deriving from the "original image" in the horizontal direction and "deformation maps (vertical-direction deformation maps)" for modulating the pixels in the vertical direction are required. Elements of the "horizontal-direction deformation map" and elements of the "vertical-direction deformation map" that correspond to the same frame may be independent from each other, or may be associated with each other (e.g. at least some of the elements may be the same as each other). A specific example of each of the "deformation maps" is a map for deforming an image using an image warping (which is also called "pixel warping") method (e.g. see Reference Literature 1 etc.).

Reference Literature 1: Kawabe, T., Maruya, K., & Nishida, S., "Perceptual transparency from image deformation," Proceedings of the National Academy of Sciences, Aug. 18, 2015, 112 (33), E4620-E4627, [retrieved on Mar. 20, 2018], the Internet <https://doi.org/10.1073/pnas.1500913112>

The "low-spatial frequency components" mean spatial frequency components with an absolute value that is smaller than or equal to a predetermined value. Examples of the "low-spatial frequency components" are components with an absolute value of the spatial frequency that is 3 cpd (cycles per degree) or less. For example, the "deformation maps" mainly includes the "low-spatial frequency components". The "deformation maps" may only include the "low-spatial frequency components", or may include the "low-spatial frequency components" and other spatial frequency components.

The "plurality of different deformation maps" correspond to respective frames. That is to say, the "plurality of different deformation maps" indicate the moving directions and the moving amounts in the respective frame. Note that the "frames" correspond to respective frames that constitute the video that is to be generated by the video generating device and are arranged in time series. For example, if a video that is to be generated has a duration of 1 second, and a one-second video is constituted by 30 frames of images, the number of "different deformation maps" is 30. The video generating device moves the pixels deriving from the "original image" that correspond to the respective elements of the "deformation map" corresponding to each frame, in a moving direction by a moving amount, the moving direction and the moving amount being specified by the elements of the "deformation map", and generates a "modulated image" corresponding to this frame. For example, the video generating device moves the pixels of the "original image" in a moving direction by a moving amount, the moving direction and the moving amount being specified by the elements of the "deformation map" for a first frame $f_0$ that correspond to the respective pixels, to obtain the "modulated image" corresponding to the frame $f_0$. For the second or subsequent frame $f_i$, similarly, the video generating device moves the pixels of the "original image" in a moving direction by a moving amount, the moving direction and the moving amount being specified by the elements of the "deformation map" for the frame $f_i$ that correspond to the respective pixels, to obtain the "modulated image" corresponding to the frame $f_i$. Alternatively, a configuration may be employed in which the video generating device uses the "original image" as the "modulated image" for the first frame $f_0$, and, for the second or subsequent frame $f_i$, the video generating device moves the pixels of the "modulated image" for a frame which is the immediately previous frame of the frame $f_i$, in a moving direction by a moving amount, the moving direction and the moving amount being specified by the elements of the "deformation map" that correspond to the respective frames, to obtain the "modulated image" corresponding to the frame $f_i$. Alternatively, instead of using the "original image" as the "modulated image" for the first frame $f_0$, the video generating device may move the pixels of the "original image" in a moving direction by a moving amount, the moving direction and the moving amount being specified by the elements of the "deformation map" for the frame $f_0$ that correspond to the respective pixels, and may thus obtain the "modulated image" corresponding to the frame $f_0$. A description will be given of the case where the "deformation maps (horizontal-direction deformation maps)" for modulating the pixels deriving from the "original image" in the horizontal direction and the "deformation maps (vertical-direction deformation maps)" for modulating these pixels in the vertical direction are used, for example. The video generating device moves the pixels deriving from the "original image" that correspond to the respective elements of the "horizontal-direction deformation map" corresponding to each frame, in the moving direction (horizontal direction) by the moving amount, the moving direction and the moving amount being specified by the elements of the "horizontal-direction deformation map", moves the pixels deriving from the "original image" that correspond to the respective elements of the "vertical-direction deformation map" corresponding to this frame, in the moving direction (vertical direction) by the moving amount, the moving direction and the moving amount being specified by the elements of the "vertical-direction deformation map", and generates the "modulated image" corresponding to this frame. For example, for the first frame $f_0$, the video generating device moves the pixels of the "original image" that correspond to the respective elements of the "horizontal-direction deformation map" corresponding to the first frame $f_0$, in the moving direction (horizontal direction) by the moving amount, the moving direction and the moving amount being specified by the elements of the "horizontal-direction deformation map", moves the pixels of the "original image" that correspond to the respective elements of the "vertical-direction deformation map" corresponding to the first frame $f_0$, in the moving direction (vertical direction) by the moving amount, the moving direction and the moving amount being specified by the elements of the "vertical-direction deformation map", to obtain the "modulated image" corresponding to the first frame $f_0$. For the second or subsequent frame $f_i$, similarly, the video generating device moves the pixels of the "original image" that correspond to the respective elements of the "horizontal-direction deformation map" corresponding to the frame $f_i$, in a moving direction by a moving amount, the moving direction and the moving amount being specified by the elements of the "horizontal-direction deformation map", moves the pixels of the "original image" that correspond to the respective elements of the "vertical-direction deformation map" corresponding to the frame $f_i$, in a moving direction by a moving amount, the moving direction and the moving amount being specified by the elements of the "vertical-direction deformation map", to obtain the "modulated image" corresponding to the frame $f_i$. Alternatively, for the second or subsequent frame $f_i$, the video generating device may alternatively move the pixels of the "modulated image" for the frame which is the immediately previous frame of the frame $f_i$, the pixels corresponding to the respective elements of the "horizontal-direction deformation map" corresponding to the frame $f_i$, in the moving direction (horizontal direction) by the moving amount, the moving direction and the moving amount being specified by the elements of the "horizontal-direction deformation map", move the pixels of the "modulated image" for the frame $f_{i-1}$ that correspond to the respective elements of the "vertical-direction deformation map" corresponding to the frame $f_i$, in the moving direction (vertical direction) by the moving amount, the moving direction and the moving amount being specified by the elements of the "vertical-direction deformation map", to obtain the "modulated image" corresponding to the frame $f_i$. Alternatively, for the first frame $f_0$, the video generating device may use the "original image" as the "modulated image". For example, an image warping method may be used to generate the "modulated image". The "plurality of modulated images" corresponding to a plurality of frames are obtained by executing the above processing for the plurality of frames.

Each of the "plurality of modulated images" obtained (i.e. modulated images corresponding to the respective frames) are separated into brightness components and color components. Thus, "brightness component images", which are the brightness components of the "modulated images" corresponding to the respective frames, and "color component images", which are the color components of the "modulated images" corresponding to the respective frames, are obtained. In other words, a pair of the "brightness component image" and the "color component image" corresponding to each frame is obtained. By performing this processing for a plurality of frames, a plurality of "brightness component images" and a plurality of "color component images" corresponding to the plurality of frames are obtained. In other words, a plurality of pairs of the "brightness component image" and the "color component image" are obtained. It is desirable that the brightness of the "brightness component images" and the color of the "color component images" are independent from each other. That is to say, it is desirable that the brightness components can be changed by changing the brightness of the "brightness component images" without changing the color components of the "modulated images", and that the color components can be changed by changing the color of the "color component images" without changing the brightness components of the "modulated images". For example, it is desirable that the coordinate system of pixel values indicated by the "brightness component images" and the coordinate system of pixel values indicated by the color component images are orthogonal to each other. For example, if the "modulated image" is expressed in the RGB color system, the video generating device converts the "modulated image" to a color system (e.g. the CIE Lab color system, the CIE Yxy color system, the CIE HSV color system) with which the "modulated image" can be separated into a brightness dimension and a color dimension, and obtains the "brightness component image" and the "color component image" in the post-conversion color system.

When the color of the "transparent material perception" is operated, the video generating device modulates the color of a plurality of "color component images" in accordance with the "color modulation information", to obtain a plurality of "color-modulated images". The "color modulation information" may be information that indicates the color, or may be information that indicates a change in color. If the "color modulation information" is information that indicates the color, the video generating device obtains the "color-modulated images" obtained by modulating the color of the "color component images" into the color indicated by the "color modulation information". If the "color modulation information" is information that indicates a change in color (e.g. a changing direction and a changing amount in a color space), the video generating device obtains the "color-modulated images" obtained by changing the color of the "color component images" by the amount indicated by the "color modulation information".

When the brightness (lightness) of the "transparent material perception" is operated, the video generating device modulates the brightness of the plurality of "brightness component images" in accordance with the "brightness modulation information" and obtains a plurality of "brightness-modulated image". The "brightness modulation information" may be information that indicates the brightness of the "brightness component images", or may be information that indicates a change in brightness (e.g. a changing direction and a changing amount in the brightness dimension) of the "brightness component images". If the "brightness modulation information" is information that indicates the brightness of the "brightness component images", the video generating device obtains "brightness-modulated images" obtained by modulating the brightness of the "brightness component images" into the brightness indicated by the "brightness modulation information". If the "brightness modulation information" is information that indicates a change in brightness, the video generating device obtains "brightness-modulated images" obtained by changing the brightness of the "brightness component images" by the amount indicated by the "brightness modulation information".

If only the color of the "transparent material perception" is operated, the video generating device obtains a video that is configured by temporally arranging a plurality of "integrated images", which are obtained by integrating the "brightness component images" and the "color-modulated images". For example, the "integrated image" corresponding to each frame is obtained by integrating a set of the "brightness component image" and the "color-modulated image" corresponding to the frame. The integration of the "brightness component image" and the "color-modulated image" means generating an image with the brightness component that corresponds to the "brightness component image" (e.g. the brightness component indicated by the "brightness component image") and the color component that corresponds to the "color-modulated image" (e.g. the color component indicated by the "color-modulated image").

If only the brightness of the "transparent material perception" is operated, the video generating device obtains a video that is configured by temporally arranging a plurality of integrated image obtained by integrating the "brightness-modulated images" and the "color component images". For example, the "integrated image" corresponding to each frame is obtained by integrating a set of the "brightness-modulated image" and the "color component image" corresponding to the frame. The integration of the "brightness-modulated image" and the "color component image" means generating an image with the brightness component that corresponds to the "brightness-modulated image" (e.g. the brightness component indicated by the "brightness-modulated image") and the color component that corresponds to the "color component image" (e.g. the color component indicated by the "color component image").

If the color and brightness of the "transparent material perception" are operated, the video generating device obtains a video that is configured by temporally arranging a plurality of "integrated images" obtained by integrating the "brightness-modulated images" and the "color-modulated images". For example, the "integrated image" corresponding to each frame is obtained by integrating a set of the "brightness-modulated image" and the "color-modulated image" corresponding to this frame. The integration of the "brightness-modulated image" and the "color-modulated image" means generating an image with the brightness component that corresponds to the "brightness-modulated image" (e.g. the brightness component indicated by the "brightness-modulated image") and the color component that corresponds to the "color-modulated image" (e.g. color component indicated by the "color-modulated image").

The "deformation maps" may indicate the moving direction and the moving amount of pixels belonging to a "deformation region", and the video generating device may modulate the color in the "deformation region", or the "deformation region" and a region therearound, in the plurality of "color component images" to obtain a plurality of "color-modulated images", or may modulate the brightness in the "deformation region", or the "deformation region" and a region therearound, in the plurality of "brightness component images" to obtain a plurality of "brightness-modulated images". The "deformation region" may be common (the same) to all frames, or a "deformation region" corresponding to at least some of the frames may differ from a "deformation region" corresponding to the other frames. The spatial position of the "deformation region" corresponding to all or some of the frames is the same as a spatial region of a portion of the "original image". If the "deformation maps (horizontal-direction deformation maps)" for modulating the pixels deriving from the "original image" and the "deformation maps (vertical-direction deformation maps)" for modulating the pixels deriving from the "original image" are used, the spatial position of the "deformation region" in the "horizontal-direction deformation map" and the spatial position of the "deformation region" in the "vertical-direction deformation map" corresponding to the same frame are the same. Elements of the "deformation maps" that correspond to respective pixels included in the "deformation region" indicate a moving direction and a moving amount other than zero (i.e. a moving amount with a positive absolute value) of the pixels, and elements of the "deformation maps" that correspond to respective pixels that are not included in the "deformation region" indicate that the moving amount of these pixels is zero. If the video generating device modulates the color in the "deformation region", or the "deformation region" and a region therearound, of the plurality of "color component images", an observer who sees the "video" that is obtained as described above is given the illusion that a substance with a "transparent material perception" that has the color corresponding to the "color modulation information" is disposed between the "original image" and the observer. If the video generating device modulates the brightness of the "deformation region", or the "deformation region" and a region therearound, of a plurality of "brightness component images", an observer who sees the "video" that is obtained as described above is given the illusion that a substance with a "transparent material perception" that has the brightness corresponding to the "brightness modulation information" is disposed between the "original image" and the observer. It should be remarked that, even if the color and/or the brightness of the region around the "deformation region" has been modulated, the illusion is given that the color and/or the brightness of the "transparent material perception" that exists between a substance expressed by the "original image" and the observer, rather than the color and/or the brightness of the substance expressed by the "original image", has been modulated. To clearly create such an illusion, it is desirable that the "region around the deformation region" is a region (spatial region) at an angle of view relative to the "deformation region" that is 0.12 degrees or less.

The outline of the "deformation region" may also be deformed. That is to say, the "plurality of different deformation maps" may indicate the moving direction and the moving amount of pixels in a plurality of "deformation regions", and the plurality of "deformation regions" may be obtained by deforming the outline of an "original deformation region" included in the "original image", using a plurality of different "second deformation maps" that have low-spatial frequency components. The "plurality of deformation regions" have different outlines. In this configuration, at least one of the absolute values of the spatial frequency components of the "second deformation maps" and the amplitude of the "second deformation maps" is modulated (changed) in accordance with "viscosity modulation information". Thus, the illusion can be given that a substance with a "transparent material perception" that has the aforementioned color and/or brightness and further has a desired viscosity is disposed between the original image and the observer.

In the above case, each of the "plurality of deformation regions" is a region with elements that are not zero in the "deformation map" for each frame. That is to say, the "plurality of deformation regions" are regions with elements that are not zero in the "deformation maps" for a plurality of frames. The spatial position of the "deformation region" corresponding to all or some of the frames is the same as the spatial region of a portion the "original image". The outline in the "deformation map" for each frame can be obtained by deforming the outline of the "original deformation region" using the "second deformation map" corresponding to the frame. The "original deformation region" may be a spatial region included in the "original image", or may be a spatial region that overlaps the "original image". The outline of each "deformation region" means the boundary that defines the "deformation region". That is to say, the outline of each "deformation region" means the boundary between the "deformation region" and the spatial region other than the "deformation region". Similarly, the outline of an "original deformation region" means the boundary that defines the "original deformation region". That is to say, the outline of the "original deformation region" means the boundary between the "original deformation region" and the spatial region other than the "original deformation region". Examples of the shape of the "outline" include a circle, an ellipse, a rectangle, a polygon, and the like.

The "second deformation maps" includes "low-spatial frequency components". For example, the "second deformation maps" mainly include "low-spatial frequency components". The "second deformation maps" may only include "low-spatial frequency components", or may include "low-spatial frequency components" and other spatial frequency components. For example, the video generating device modulates an "original deformation region image" that specifies the "original deformation region" to obtain, for each frame, a "deformation region image" that specifies the "deformation region", using the "second deformation map" corresponding to the frame, and specifies the "deformation region" of the frame using the "deformation region image". For example, the "original deformation region image" is a two-dimensional array with the same size as the "original image". Examples of the "original deformation region image" is a two-dimensional array in which pixel values in the "original deformation region" are values other than zero (e.g. positive constants such as 1), and pixel values in the other region are zero. For example, the "deformation region image" is a two-dimensional array with the same size as the "original image". Examples of the "deformation region image" is a two-dimensional array in which pixel values in the "deformation region" are values other than zero (e.g. positive constants such as 1), and pixel values in the other region are zero. Each of the "second deformation maps" is a two-dimensional distribution (distortion distribution) of values (distortion amount) that indicates the amount by which the pixels deriving from the "original deformation region image" are to be distorted. The "pixels deriving from the original deformation region image" may be pixels of the "original deformation region image", or may be pixels of an image obtained by moving the pixels of the "original deformation region image". An example of each of the "second deformation map" is a two-dimensional array of pixel values of pixels (elements) that indicates the moving direction and the moving amount of the pixels deriving from the "original deformation region image". For example, the moving direction of each of the pixels deriving from the "original deformation region image" is expressed by the positive or negative sign of the pixel value of the pixel of the "second deformation region images" that corresponds to the pixel deriving from the "original deformation region image", and the moving amount of each of the pixels deriving from the "original deformation region image" is expressed by the absolute value of the pixel value of the pixel of the "second deformation maps" that corresponds to the pixel deriving from the "original deformation region image". For example, the position (coordinates) of each of the pixels deriving from the "original deformation region image" is the same as the position (coordinates) of a pixel of the "second deformation maps" that indicates the moving direction and the moving amount of the pixel. If the moving direction of a pixel is expressed by the positive or negative sign of a pixel value thereof, only a one-dimensional direction can be specified. For this reason, to deform the pixels deriving from the "original deformation region image" in a two-dimensional direction, "second deformation maps (second horizontal-direction deformation maps)" for modulating the pixels deriving from the "original deformation region image" in the horizontal direction, and "second deformation maps (second vertical-direction deformation maps)" for modulating the pixels deriving from the "original deformation region image" in the vertical direction are required. A specific example of each of the "second deformation maps" is a map for deforming an image using an image warping method. The video generating device moves the pixels deriving from the "original deformation region image" in a moving direction by a moving amount, the moving direction and the moving amount being specified by respective elements of the "second deformation map" corresponding to each frame, and generates a "deformation region image" corresponding to the frame. For example, for the first frame $f_0$, the video generating device moves the pixels of the "original deformation region image" in the moving direction and the moving amount, the moving direction and the moving amount being specified by the elements, corresponding to the respective pixels, of the "second deformation map" for the frame $f_0$, and obtains a "deformation region image" corresponding to the frame $f_0$. For example, for the second or subsequent frame $f_i$, similarly, the video generating device moves the pixels of the "original deformation region image" in a moving direction by a moving amount, the moving direction and the moving amount being specified by the elements, corresponding to the respective pixels, of the "second deformation map" for the frame $f_i$, and obtains the "deformation region image" corresponding to the frame $f_i$. Alternatively, for the second or subsequent frame $f_i$, the video generating device may move the pixels of the "deformation region image" for the frame which is the immediately previous frame of the frame $f_i$, in a moving direction by a moving amount, the moving direction and the moving amount being specified by the elements, corresponding to the respective pixels, of the "second deformation map" corresponding to the frame $f_i$, and obtain the "deformation region image" corresponding to the frame $f_i$. Alternatively, for the first frame $f_0$, the "original deformation region image" may be used as the "deformation region image". A description will be given of the case where the "second deformation maps (second horizontal-direction deformation maps)" for modulating the pixels deriving from the "original deformation region image" in the horizontal direction, and the "second deformation maps (second vertical-direction deformation maps)" for modulating the pixels deriving from the "original deformation region image" in the vertical direction are used, for example. The video generating device moves the pixels deriving from an "original deformation region image" that correspond to respective elements of the "second horizontal-direction deformation map" corresponding to each frame, in a moving direction (horizontal direction) by a moving amount, the moving direction and the moving amount being specified by the elements of this "second horizontal-direction deformation map, moves the pixels deriving from the "original deformation region image" that correspond to respective elements of the "second vertical-direction deformation map" corresponding to the frame, in a moving direction (vertical direction) by a moving amount, the moving direction and the moving amount being specified by the elements of this "second vertical-direction deformation map", and generates the "deformation region image" corresponding to the frame. For example, for the first frame $f_0$, the video generating device moves the pixels of the "original deformation region image" that correspond to the respective elements of the "second horizontal-direction deformation map" corresponding to the first frame $f_0$, in a moving direction (horizontal direction) by a moving amount, the moving direction and the moving amount being specified by the elements of the "second horizontal-direction deformation map", moves the pixels of the "original deformation region image" that correspond to the respective elements of the "second vertical-direction deformation map" corresponding to the first frame $f_0$, in a moving direction (vertical direction) by a moving amount, the moving direction and the moving amount being specified by the "second vertical-direction deformation map", and obtains the "deformation region image" corresponding to the first frame $f_0$. For example, for the second or subsequent frame $f_i$, similarly, the video generating device moves pixels of the "original deformation region image" that correspond to the respective elements of the "second horizontal-direction deformation map" corresponding to the frame $f_i$, in a moving direction (horizontal direction) by a moving amount, the moving direction and the moving amount being specified by the elements of the "second horizontal-direction deformation map", moves the pixels of the "original deformation region image" that correspond to the respective elements of the "second vertical-direction deformation map" corresponding to the frame $f_i$, in a moving direction (vertical direction) by a moving amount, the moving direction and the moving amount being specified by the elements of the "second vertical-direction deformation map" corresponding to the frame $f_i$, and obtains the "deformation region image" corresponding to the frame $f_i$. Alternatively, for the second or subsequent frame $f_i$, the video generating device may move the pixels of the "deformation region image" for the frame $f_{i-1}$, which is the immediately previous frame of the frame $f_i$, the pixels corresponding to the respective elements of the "second horizontal-direction deformation map" corresponding to the frame $f_i$, in a moving direction (horizontal direction) by a moving amount, the moving direction and the moving amount being specified by the elements of this "second horizontal-direction deformation map", move the pixels of the "deformation region image" for the frame $f_{i-1}$ that correspond to the respective elements of the "second vertical-direction deformation map" corresponding to the frame $f_i$, in a moving direction (vertical direction) by a moving amount, the moving direction and the moving amount being specified by the elements of this "second vertical-direction deformation map", and obtain the "deformation region image" corresponding to the frame $f_i$. For example, an image warping method can be used to generate the "deformation region image". The "plurality of deformation region images" corresponding to a plurality of frames are obtained by executing the above processing for the plurality of frames.

The perception expressed by a "video" can be changed by changing spatial frequency components and/or the amplitude of the "second deformation maps". For this reason, a "video" that expresses a desired perception can be generated by operating the spatial frequency components and/or the amplitude of the "second deformation maps".

For example, the larger the absolute values of the spatial frequency components included in the "second deformation maps" are, the better a "video" that expresses a perception of a low-viscosity substance can be generated. That is to say, the "second deformation maps" used in the case of generating a "video" for expressing the perception of a "first substance" include higher spatial frequency components than spatial frequency components of the "second deformation maps" used in the case of generating a "video" for expressing the perception of a "second substance", and the viscosity of the "first substance" is lower than the viscosity of the "second substance". Example of the "first substance" and the "second substance" are transparent or translucent substances. For example, the "second deformation maps" used in the case of generating a "video" for expressing the perception of the "first substance" mainly include spatial frequency components with the absolute values of the spatial frequency that are α1 or less, and the "second deformation maps" used in the case of generating a "video" for expressing the perception of the "second substance" mainly include spatial frequency components with the absolute values of the spatial frequency that are α2 or less (here, α1>α2). For example, the "second deformation maps" used in the case of generating a "video" for expressing the perception of the "first substance" is only constituted by spatial frequency components with the absolute values of the spatial frequency that are α1 or less, and the "second deformation maps" used in the case of generating a "video" for expressing the perception of the "second substance" is only constituted by spatial frequency components with the absolute values of the spatial frequency that are α2 or less (here, α1>α2). For this reason, the perception of a substance expressed by the generated "video" can be operated by operating the upper limit or the average value of the absolute values of the spatial frequency components included in the "second deformation maps", or the ratio of the spatial frequency components to all of the spatial frequency components included in the "second deformation map". By performing this operation, the impression received from a transparent or translucent substance (including one whose color and/or brightness has been operated) expressed by the "video" can be changed from appearing solid to liquid, or from appearing liquid to gas, and vice versa, for example.

For example, the perception expressed by a "video" can be changed by changing the amplitude (the size of the elements) of the "second deformation maps". For example, the average amplitude of the "second deformation maps" used in the case of generating a "video" for expressing the perception of a solid is smaller than the average amplitude of the "second deformation maps" used in the case of generating a "video" for expressing the perception of a liquid. For example, the largest amplitude of the "second deformation maps" used in the case of generating a "video" for expressing the perception of a solid is smaller than the largest amplitude of the "second deformation maps" used in the case of generating a "video" for expressing the perception of a liquid. For this reason, by operating the amplitude of the "second deformation maps", the impression received from a transparent or translucent substance expressed by a "video" can be changed from appearing solid to liquid, or from appearing liquid to gas, and vice versa, for example. Note that the absolute values of the spatial frequency components included in the "second deformation maps" and the amplitude of the "second deformation maps" can be adjusted independently from each other. That is to say, the amplitude of the "second deformation maps" may be adjusted while fixing the absolute values of the spatial frequency components included in the "second deformation map". Alternatively, the absolute values of the spatial frequency components included in the "second deformation maps" may be adjusted while fixing the amplitude of the "second deformation maps". Alternatively, both the absolute values of the spatial frequency components included in the "second deformation maps" and the amplitude of the "second deformation maps" may be adjusted. That is to say, at least one of them can be adjusted, as appropriate, in accordance with how to change the impression to be received from the transparent or translucent substance expressed by the "video" (e.g. change the impression from gas to liquid).

It is desirable that the upper limit values of the absolute values of the spatial frequency components that are mainly included in the "deformation maps" and the "second deformation maps" are the same as or close to each other. That is to say, it is desirable that the "deformation maps" mainly include spatial frequency components with absolute values of the spatial frequency that are smaller than or equal to a "first value" (e.g. the "deformation maps" only include spatial frequency components with absolute values of the spatial frequency that are smaller than or equal to the "first value"), the "second deformation maps" mainly include spatial frequency components with absolute values of the spatial frequency that are smaller than or equal to a "second value" (e.g. the "second deformation maps" only include spatial frequency components with absolute values of the spatial frequency that are smaller than or equal to the "second value"), and the "first value" is equal to or close to the "second value". This is because, if the upper limit values of the absolute values of the spatial frequency components that are mainly included in the "deformation maps" and the "second deformation maps" significantly differ from each other, there is a possibility that a desired perception that the video is attempting to make the observer perceive cannot be perceived.

Also, the perception expressed by a "video" changes as a result of the blurring amount (or sharpness) of the outline of the "deformation region", i.e. the amount by which the outline of the "deformation region" changing. For this reason, a "video" that expresses a desired perception can be generated by operating the blurring amount (or sharpness) of the outline of the "deformation region" in accordance with the "viscosity modulation information". For example, the blurring amount of the outline of the "deformation region" when a "video" for expressing the perception of a solid is generated is smaller than the blurring amount of the "deformation region" when a "video" for expressing the perception of a liquid is generated. For this reason, the impression received from a transparent or translucent substance expressed by a "video" can be changed from appearing solid to liquid, or from appearing liquid to gas, and vice versa, for example, by operating the blurring amount of the outline of the "deformation region". Note that the blurring amount of the outline of the "deformation region" can also be adjusted independently from the absolute values of the spatial frequency components included in the "second deformation maps" and the amplitude of the "second deformation maps". That is to say, the blurring amount of the outline of the "deformation region" may be adjusted while fixing at least one of the absolute values of the spatial frequency components included in the "second deformation maps" and the amplitude of the "second deformation maps". Alternatively, at least one of the absolute values of the spatial frequency components included in the "second deformation maps" and the amplitude of the "second deformation maps" may be adjusted while fixing the blurring amount of the outline of the "deformation region". Alternatively, all of the blurring amount of the outline of the "deformation region", the absolute values of the spatial frequency components included in the "second deformation maps", and the amplitude of the "second deformation maps" may be adjusted. That is to say, at least any of them can be adjusted, as appropriate, in accordance with how to change the impression to be received from the transparent or translucent substance expressed by the "video" (e.g. change the impression from gas to liquid).

By performing the aforementioned "integration" for each frame, a plurality of "integrated images" corresponding to a plurality of frames can be obtained, and a "video" is obtained by arranging these "integrated images" in the order of corresponding frames (i.e. arranging the "integrated images" in chronological order). That is to say, the plurality of "integrated images" are temporally ordered, and a "video" is configured by temporally arranging the plurality of "integrated images" in accordance with this ordering. Here, it is desirable that a change in the "deformation maps" that are temporally adjacent to each other (a temporal change in the elements of the "deformation maps" for adjacent frames) and a change in the "second deformation maps" that are temporally adjacent to each other (a temporal change in the elements of the "second deformation maps" for adjacent frames) are smooth. This is because a "video" can be generated that makes a natural perception of a liquid, a gas, or the like to be perceived.

First Embodiment

The first embodiment will describe an example of independently operating both color and brightness of a transparent material perception.

<Configuration>
As shown as an example in FIG. 1, a video generating device 1 according to this embodiment has a deformation map generating unit 11, a modulation region determining unit 12, a distortion modulating unit 13, a separating unit 14, a color modulating unit 15 (modulating unit), a brightness modulating unit 16 (modulating unit), an integrating unit 17, and a storing unit 18. Note that input data and data obtained by each unit are stored in the storing unit 18. Data stored in the storing unit 18 is read out and used as needed.

<Processing>
Next, processing according to this embodiment will be described.

<Processing Performed by Deformation Map Generating Unit 11>

A three-dimensional noise image N, amplitude information A, spatial frequency information SF, temporal frequency information TF, and deformation region information PS are input to the deformation map generating unit 11 according to this embodiment. The three-dimensional noise image N is a noise image that has a temporal dimension and a two-dimensional spatial dimension. In other words, the three-dimensional noise image N has a plurality of two-dimensional noise images that serve as bases of deformation maps MP corresponding to a plurality of frames. The three-dimensional noise image N according to this embodiment includes a horizontal-direction noise image $N_H$, which serves as a basis of the aforementioned "horizontal-direction deformation maps", and a vertical-direction noise image $N_V$, which serves as a basis of the "vertical-direction deformation maps". Each pixel of the horizontal-direction noise image $N_H$ and the vertical-direction noise image $N_V$ is any of a positive value, a negative value, and a zero value. The size in the spatial dimension of the three-dimensional noise image N according to this embodiment (the size in the spatial dimension of the horizontal-direction noise image $N_H$ and the size of the vertical-direction noise image $N_V$) is the same as the size of an original image (e.g. 256×256 pixels). Examples of the three-dimensional noise image N include a three-dimensional Gaussian noise image and three-dimensional white noise. The amplitude information A is information for operating the amplitude (the absolute value of a pixel value) of each element (pixel) of the deformation maps MP corresponding to each frame. For example, the largest value of the amplitude of each pixel of the deformation maps MP is determined based on the amplitude information A. The spatial frequency information SF is information for operating the spatial frequency of the deformation maps MP. For example, the absolute values of the spatial frequency components include in the deformation maps MP are determined based on the spatial frequency information SF. An example of the spatial frequency information SF is information that defines the absolute values of the spatial frequency components included in the deformation maps MP as being 3 cpd or less. For example, the cutoff frequency of a low-pass filter for the spatial dimension used when the deformation maps MP are generated is determined in accordance with the spatial frequency information SF. For example, the spatial frequency information SF specifies the cutoff frequency (e.g. 3 cpd or less) of the aforementioned low-pass filter for the spatial dimension. The temporal frequency information TF is information for operating the temporal frequency of a plurality of deformation maps MP corresponding to a plurality of frames. For example, the absolute values of temporal frequency components included in the plurality of deformation maps MP corresponding to the plurality of frames are determined based on the temporal frequency information TF. An example of the temporal frequency information TF is information that defines the absolute values of the temporal frequency components of the plurality of deformation maps MP corresponding to the plurality of frames as being 8 Hz or less. For example, the cutoff frequency of a low-pass filter for the temporal dimension of the plurality of deformation maps MP corresponding to the plurality of frames is determined in accordance with the temporal frequency information TF. For example, the temporal frequency information TF specifies the cutoff frequency (e.g. 8 Hz or less) of the aforementioned low-pass filter for the temporal dimension. The deformation region information PS is information for specifying the spatial position and the shape of a deformation region.

The deformation map generating unit 11 obtains a plurality of deformation maps MP corresponding to a plurality of frames (i.e. deformation maps MP corresponding to respective frames that constitute a video M to be generated by the integrating unit 17, as will be described later, and are arranged in time series), using the aforementioned three-dimensional noise image N, the amplitude information A, the spatial frequency information SF, the temporal frequency information TF, and the deformation region information PS, and outputs the obtained deformation maps MP. For example, the deformation map generating unit 11 generates the plurality of deformation maps MP corresponding to the plurality of frames, using the method described in Patent Literature 1, Reference Literature 1, or the like. The deformation map MP corresponding to each frame includes a horizontal-direction deformation map $M_{WH}$ and a vertical-direction deformation map $M_{WV}$. The horizontal-direction deformation map $M_{WH}$ is a two-dimensional array of pixel values of pixels that indicate a moving direction (positive/negative sign) and a moving amount (absolute value) of the respective pixels. The vertical-direction deformation map $M_{WV}$ is a two-dimensional array of pixel values of pixels that indicate a moving direction (positive/negative sign) and a moving amount (absolute value) of the respective pixels. The size of the spatial regions of the horizontal-direction deformation map $M_{WH}$ and the vertical direction deformation map $M_{WV}$ is the same as the size of the original image. The horizontal-direction deformation map $M_{WH}$ and the vertical-direction deformation map $M_{WV}$ have absolute values that are zero or more only in a deformation region, which is a partial spatial region specified by the deformation region information PS, and has absolute values that are zero values in the other region. The spatial position and the shape of the deformation region in the horizontal-direction deformation map $M_{WH}$ is the same as the spatial position and the shape of the deformation region in the vertical-direction deformation map $M_{WV}$. Pixel values at each spatial position in the horizontal-direction deformation map $M_{WH}$ and the vertical-direction deformation map $M_{WV}$ may be independent from each other, or may be correlated with each other. For example, the deformation map generating unit 11 converts the horizontal-direction noise image $N_H$ and the vertical-direction noise image $N_V$ included in the three-dimensional noise image N to spatial frequency domains, filters the spatial frequency domains with a low-pass filter (e.g. a low-pass filter with a cutoff frequency of 3 cpd or less) for the spatial dimension that is based on the spatial frequency information SF, then returns the spatial frequency domains to spatial regions, further normalizes the spatial regions, and replaces the absolute values in a region other than the deformation region with a zero value based on the deformation region information PS, thereby obtaining a plurality of horizontal-direction deformation maps $M_{WH}$ and vertical-direction deformation maps $M_{WV}$ corresponding to a plurality of frames (i.e. deformation maps MP=($M_{WH}$, $M_{WV}$), which are constituted by the horizontal-direction deformation maps $M_{WH}$ and the vertical-direction deformation maps $M_{WV}$ corresponding to the respective frames that constitute the video M to be generated by the integrating unit 17, as will be described later, and are arranged in time series. When performing the normalization, the deformation map generating unit 11 may also adjust the amplitude of the horizontal-direction deformation maps $M_{WH}$ and the vertical-direction deformation maps $M_{WV}$ based on the amplitude information A. Also, the deformation map generating unit 11 may filter the horizontal-direction noise image $N_H$ and the vertical-direction noise image $N_V$ in the temporal dimension with a low-pass filter (e.g. a low-pass filter with a cutoff frequency of 8 Hz or less) for the temporal dimension that is based on the temporal frequency information TF, and then convert them to the spatial frequency domains. Thus, the horizontal-direction deformation maps $M_{WH}$ and the vertical-direction deformation maps $M_{WV}$ can be obtained that smoothly change the pixel values in the deformation region between frames.

<Processing Performed by Distortion Modulating Unit 13>

An original image P and the plurality of deformation maps MP=($M_{WH}$, $M_{WV}$) corresponding to a plurality of frames (the plurality of different deformation maps that have elements corresponding to respective pixels deriving from the original image P, the elements indicating a moving direction and a moving amount of the respective pixel, and that have low-spatial frequency components) output from the deformation map generating unit 11 are input to the distortion modulating unit 13. The distortion modulating unit 13 moves the pixels deriving from the original image P in a moving direction by a moving amount, the moving direction and the moving amount being specified by the elements of the deformation maps MP=($M_{WH}$, $M_{WV}$) that correspond to the respective pixels, using the deformation maps MP=($M_{WH}$, $M_{WV}$) for the respective frames, to obtain modulated images P1 for the respective frames. For example, the distortion modulating unit 13 deforms the pixels deriving from the original image P using the deformation maps MP=($M_{WH}$, $M_{WV}$) for the respective frames to obtain the modulated images P1 for the respective frames, using an image warping method (e.g. see Patent Literature 1, Reference Literature 1 etc.). For example, the modulated image P1 for each frame is an image obtained by deforming the original image P using the deformation map MP=($M_{WH}$, $M_{WV}$) for this frame. Alternatively, the modulated image P1 for a top frame $f_0$ may be the original image P, and the modulated image P1 for the second or subsequent frame $f_i$ may be an image obtained by deforming the modulated image P1 for the immediately previous frame using the deformation map MP=($M_{WH}$, $M_{WV}$) for the respective frames fi. Thus, the distortion modulating unit 13 obtains a plurality of modulated images P1 corresponding to the plurality of frames (i.e. modulated images P1 corresponding to the respective frames that constitute the video M to be generated by the integrating unit 17, as will be described later, and are arranged in time series), and outputs the obtained modulated images P1.

<Processing Performed by Separating Unit 14>

The plurality of modulated images P1 corresponding to the plurality of frames are input to the separating unit 14. The separating unit 14 separates the plurality of modulated images P1 into brightness components and color components, obtains a plurality of brightness component images L (i.e. brightness component images L corresponding to the respective frames that constitute the video M to be generated by the integrating unit 17, as will be described later, and are arranged in time series) and color component images C (i.e. color component images C corresponding to the respective frames that constitute the video M to be generated by the integrating unit 17, as will be described later, and are arranged in time series) corresponding to the plurality of frames, and outputs the obtained brightness component images L and color component images C. For example, if the modulated images P1 are expressed in the RGB color system, the separating unit 14 converts the modulated images P1 to a color system (e.g. the CIE Lab color system, the CIE Yxy color system, the CIE HSV color system) with which the modulated images P1 can be separated into a brightness dimension and a color dimension, and obtains the brightness component images L and the color component images C in the post-conversion color system. For example, the separating unit 14 converts the modulated images P1 expressed in the RGB color system to modulated images P2 in the CIE Lab color system, obtains, for the respective frames, brightness component images L, each of which is a two-dimensional array of coordinate values in the brightness (lightness) dimension (L-coordinate) of the modulated images P2, and color component images C, each of which is a two-dimensional array of coordinate values of a complementary color dimension (ab-coordinate), and outputs the obtained brightness component images L and color component images C.

<Processing Performed by Modulation Region Determining Unit 12>

The modulation region information PS is input to the modulation region determining unit 12. The modulation region determining unit 12 obtains modulation region information R that expresses the spatial position and the shape of a spatial region (modulation region) in which the color and brightness are to be adjusted based on the deformation region information PS, and outputs the obtained modulation region information R. The spatial position and the shape of the modulation region according to this embodiment are the same as the spatial position and the shape of the deformation region.

<Processing Performed by Color Modulating Unit 15>

The color modulation information CM, the plurality of color component images C corresponding to the plurality of frames that are output from the separating unit 14, and the modulation region information R output from the modulation region determining unit 12 are input to the color modulating unit 15. The color modulating unit 15 obtains a plurality of color-modulated images C1 obtained by modulating, based on the color modulation information CM, the color of the modulation region of the plurality of color component images C that is based on the modulation region information R, and outputs the obtained color-modulated images C1. The plurality of color-modulated images C1 correspond to the respective frames. Thus, the modulation region (i.e. a region in the color component images C that corresponds to pixels with absolute values that are zero or more in the deformation maps) of a substance with a transparent material perception of which the illusion is to be given, as mentioned above, can be made to have a desired color. Note that if the color modulation information CM indicates that the color of the color component images C is not to be changed (i.e. the color of the color component images C is to be maintained), the color modulating unit 15 outputs the color-modulated images C1 that are the color component images C corresponding the respective frames (C1=C).

<Processing Performed by Brightness Modulating Unit 16>

The brightness modulation information LM, the plurality of brightness component images L corresponding to the plurality of frames that are output from the separating unit 14, and the modulation region information R output from the modulation region determining unit 12 are input to the brightness modulating unit 16. The brightness modulating unit 16 obtains a plurality of brightness-modulated images L1 obtained by modulating, based on the brightness modulation information LM, the brightness of the modulation region of the plurality of brightness component images L that is based on the modulation region information R, and outputs the obtained brightness-modulated images L1. The brightness-modulated images L1 correspond to the respective frames. Thus, the modulation region (i.e. a region in the brightness component images L that corresponds to pixels with absolute values that are zero or more in the deformation maps) of a substance with a transparent material perception of which the illusion is to be given, as mentioned above, can be made to have a desired lightness. For example, if the brightness (L-coordinate value) is reduced, a substance with a dark-color transparent material perception (e.g. a substance such as a heavy oil) can be perceived. If the brightness (L-coordinate value) is increased, a substance with a bright-color transparent material perception (e.g. a substance such as milk) can be perceived. Note that if the brightness modulation information LM indicates that the brightness of the brightness component images L is not to be changed (i.e. the brightness of the brightness component images L is to be maintained), the brightness modulating unit 16 outputs the brightness-modulated images L1 that are the brightness component images L corresponding to the respective frames (L1=L).

<Processing Performed by Integrating Unit 17>

The plurality of color-modulated images C1 corresponding to the plurality of frames that are output from the color modulating unit 15 and the plurality of brightness-modulated images L1 corresponding to the plurality of frames that are output from the brightness modulating unit 16 are input to the integrating unit 17. The integrating unit 17 integrates the color-modulated images C1 and the brightness-modulated images L1 for the respective frames to obtain integrated images for the respective frames, and stores the obtained integrated images in the storing unit 18. The integrated image is an image expressed in the RGB color system, for example, but may alternatively be an image expressed in another color system, such as the CIE Lab color system. The integrating unit 17 obtains a video M, which is configured by arranging the plurality of thus-obtained integrated images corresponding to the plurality of frames in the order of frames (i.e. temporally arranging the integrated images), and outputs the obtained video M. The video M is displayed on a display, or is projected onto an object such as a screen by a projector.

Characteristics of this Embodiment

An observer who sees the video M is given the illusion that a substance with a transparent material perception that has the color corresponding to the color modulation information CM and/or the brightness corresponding to the brightness modulation information LM is disposed in a region between the original image P and the observer. As mentioned above, no complex image processing technique is required to generate this video M. In addition, since color components (e.g. ab-coordinate values) and brightness components (e.g. L-coordinate values) of the video M can be operated independently, the color and the brightness of the transparent material perception can be operated independently.

Second Embodiment

In the first embodiment, color modulation and brightness modulation are performed on a modulation region that has the same spatial position and shape as those of a deformation region. The second embodiment will describe an example of performing color modulation and brightness modulation on a modulation region that is a deformation region, or a deformation region and a region around the deformation region. In the following, differences from the already-described items will be mainly described, and features that are common to the already-described items will be assigned the same reference numerals and described simply.

<Configuration>

As shown as an example in FIG. 1, a video generating device 2 according to this embodiment has a deformation map generating unit 11, a modulation region determining unit 22, a distortion modulating unit 13, a separating unit 14, a color modulating unit 15 (modulating unit), a brightness modulating unit 16 (modulating unit), an integrating unit 17, and a storing unit 18.

<Processing>

Next, processing according to this embodiment will be described. A difference between the second and first embodiment only lies in that processing performed by the modulation region determining unit 12 is replaced by the following processing performed by the modulation region determining unit 22. In the following, only processing performed by the modulation region determining unit 22 will be described.

<Processing Performed by Modulation Region Determining Unit 22>

The deformation region information PS and the modulation region information S are input to the modulation region determining unit 22. The modulation region information S is information corresponding to the positional relationship of the modulation region with respect to the deformation region, for example. For example, the modulation region information S may be information that indicates a shift amount (moving amount) of the modulation region relative to the deformation region, or may be information that indicates a shift amount and a shifting direction (moving direction) of the modulation region relative to the deformation region, or may be information that indicates a difference between the deformation region and the modulation region, or may be information that indicates how to deform the deformation region. It is desirable that the angle of view corresponding to the shift amount of the spatial position between the deformation region and the modulation region is 0.12 degrees (deg) or less (the reason will be described later). That is to say, it is desirable that "a region around the deformation region" is a region (spatial region) at an angle of view relative to the "deformation region" (namely the angle of view as seen from a position distant from the video M by a predetermined distance) that is 0.12 degrees or less. For example, if the deformation region and the modulation region are observed from a position distant from the deformation region and the modulation region by 100 cm, it is desirable to set the shift between the deformation region and the modulation region to 0.21 cm or less. The modulation region determining unit 22 obtains the modulation region information R indicating the spatial position and the shape of the modulation region, based on the deformation region information PS and the modulation region information S, and outputs the obtained modulation region information R. The modulation region according to this embodiment is the deformation region, or the deformation region and a spatial region around the deformation region. The modulation region information R is sent to the color modulating unit 15 and the brightness modulating unit 16. The color modulating unit 15 modulates the color of the deformation region, or the deformation region and the region around the deformation region, in the plurality of color component images C, and obtains a plurality of color-modulated images C1. The brightness modulating unit 16 modulates the brightness of the deformation region, or the deformation region and the region around the deformation region, in the plurality of brightness component images L, and obtains a plurality of brightness-modulated images L1. Other processing is the same as that of the first embodiment.

Characteristics of this Embodiment

In this embodiment as well, an observer who sees the video M is given the illusion that a substance with a transparent material perception that has color corresponding to the color modulation information CM and/or the brightness corresponding to the brightness modulation information LM is disposed in a region between the original image P and the observer. As mentioned above, no complex image processing technique is required to generate this video M. In addition, since color components (e.g. ab-coordinate values) and brightness components (e.g. L-coordinate values) of the video M can be operated independently, the color and the brightness of the transparent material perception to be perceived can be operated independently.

Figure 2A:
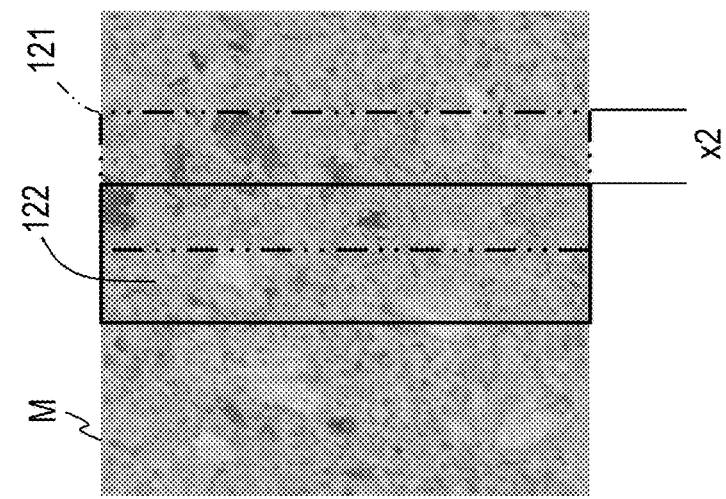
FIGS. 2A to 2C are diagrams for showing examples of a video generated in an embodiment.
Figure 2B:
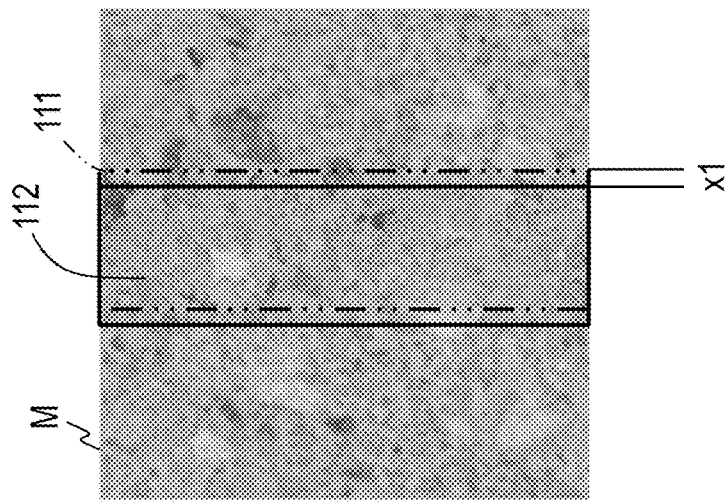
Figure 2C:
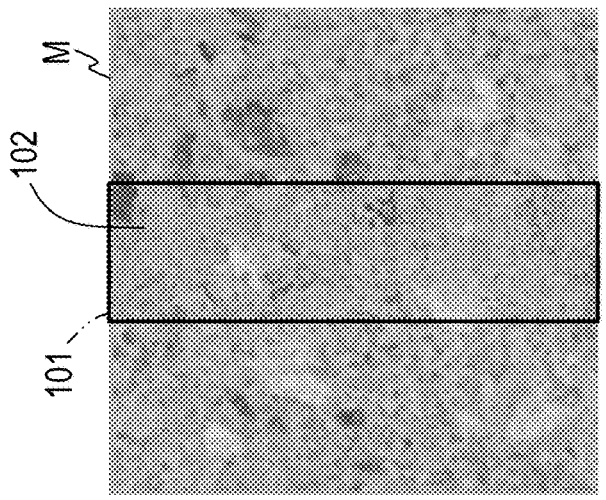
Figure 3:
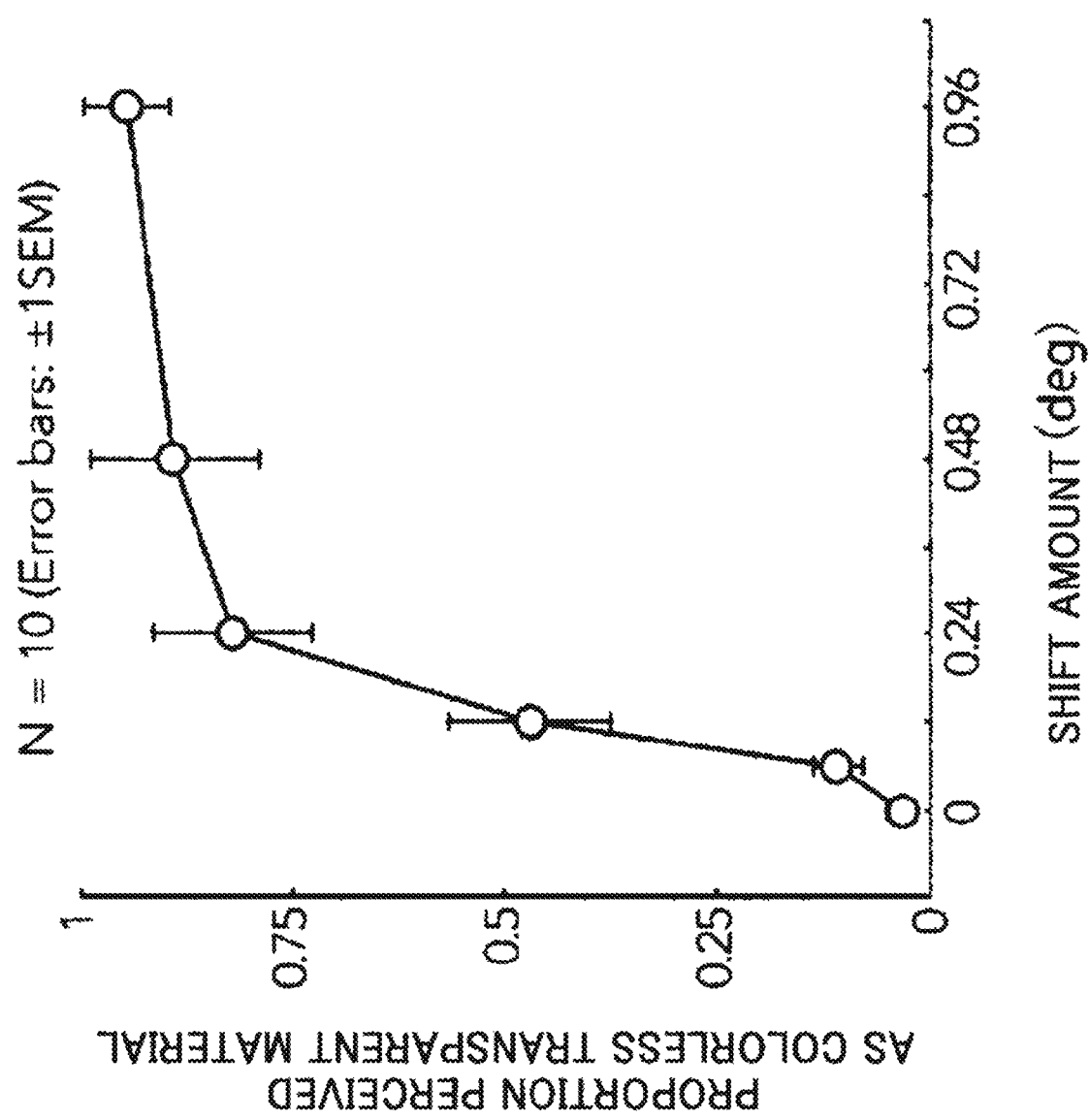
FIG. 3 is a graph showing an example of the relationship between the shift amount, i.e. the amount by which a color change region is shifted relative to a deformation region and the proportion perceived as a transparent material being colorless.

Note that, in order for the observer who sees the video M to clearly perceive the illusion that the color and/or brightness of the substance of the "transparent material perception" disposed between the original image P and the observer, rather than the color and/or the brightness of the substance indicated by the original image P, has been modulated, it is desirable that the spatial position and the shape of the modulation region do not significantly differ from the spatial position and the shape of the deformation region. Differences between the modulation region and the deformation region and the color and/or the brightness of the substance with the "transparent material perception" to be perceived by the observer are correlated with each other. In the following, an example will be experimentally described in which the degree of shifting that makes the observer perceive that the color and/or brightness of the substance with the "transparent material perception" has been modulated, in the case where the modulation region is a spatial region that is obtained by shifting the spatial position of the deformation region. In this example, the modulation region is a spatial region obtained by shifting the spatial position of a rectangular deformation region. The modulation region was changed by operating the shift amount of spatial position, and the color of each modulation region was modulated as mentioned above to generate the video M. FIG. 2A is a diagram showing an example of a video M in which a modulation region 102 and a deformation region 101 are the same. FIG. 2B is a diagram showing an example of a video M in which the shift amount of a modulation region 112 relative to a deformation region 111 is x1. FIG. 2C is a diagram showing an example of a video M in which the shift amount of a modulation region 122 relative to a deformation region 121 is x2. Note that FIGS. 2A to 2O show images in a specific frame of the video M, namely still images, but the above-described illusion is not perceived with still images. The thus-generated videos M were shown to the observer, and the observer was asked whether the observer perceived that the color of the substance with the "transparent material perception" has been modulated (i.e. a substance a the color-modulated transparent material perception), or perceived that the color of the substance indicated by the original image P, rather than the color of the substance with the "transparent material perception", has been modulated (i.e. a colorless (achromatic) transparent material). The thus-obtained relationship between the "shift amount" and the "proportion perceived as a colorless transparent material" is shown, as an example, in FIG. 3. It was understood that it is likely to be perceived that the color of the substance with the "transparent material perception" has been modulated if the shift amount is 0.12 deg or less, as shown as an example in FIG. 3. Based on this result, it can be understood that the angle of view corresponding to the shift amount of the spatial position between the "deformation region" and the "modulation region" being 0.12 degrees or less is desirable. That is to say, it is desirable that the "region around the deformation region" is a region (spatial region) at an angle of view relative to the "deformation region" that is 0.12 degrees or less. For example, if the deformation region and the modulation region are observed from a position distant from the deformation region and the modulation region by 100 cm, it is desirable to set the shift between the deformation region and the modulation region to 0.21 cm or less.

Third Embodiment

In the first and second embodiment, the position and the shape of the modulation region are determined based on the spatial position and the shape of the deformation region. For this reason, the deformation region information PS regarding the spatial position and the shape of the deformation region needs to be held until the deformation region in which the color and/or the brightness is to be modulated is determined and processing performed by the color modulating unit 15 and the brightness modulating unit 16 ends. In this embodiment, differences between pixels of the original image P and pixel of the modulated image P1 that are at the same spatial positions are calculated, and a region where the differences are not zero is determined as a modulation region. This configuration allows the modulation region to be determined without saving the deformation region information PS.

<Configuration>

As shown as an example in FIG. 1, a video generating device 3 according to this embodiment has a deformation map generating unit 11, a modulation region determining unit 32, a distortion modulating unit 13, a separating unit 14, a color modulating unit 15 (modulating unit), a brightness modulating unit 16 (modulating unit), an integrating unit 17, and a storing unit 18.

<Processing>

Next, processing according to this embodiment will be described. A difference between the third embodiment and the first and second embodiments only lies in that processing performed by the modulation region determining units 12 and 22 is replaced by the following processing performed by the modulation region determining unit 32. In the following, only processing performed by the modulation region determining unit 32 will be described.

<Processing Performed by Modulation Region Determining Unit 32>

The original image P and the modulated image P1 are input to the modulation region determining unit 32. The modulation region determining unit 32 calculates differences between pixels of the original image P and pixels of the modulated image P1 that are at the same spatial positions, determines a region where the differences are not zero as a modulation region, and outputs modulation region information R that specifies this modulation region. Alternatively, modulation region information S may further be input to the modulation region determining unit 32 as described in the second embodiment. In this case, the modulation region determining unit 32 obtains the modulation region information R indicating the spatial position and the shape of the modulation region, based on the modulation region that is specified based on the differences as mentioned above, as well as on the modulation region information S, and outputs the obtained modulation region information R. Other processing is as described in the first embodiment.

Characteristics of this Embodiment

In this embodiment, the effects described in the first and second embodiments can be achieved without holding the deformation region information PS.

Fourth Embodiment

In this embodiment, the outline of the deformation region is deformed. That is to say, a plurality of deformation regions corresponding to a plurality of frames according to this embodiment are deformation regions obtained by deforming the outline of an original deformation region included in the original image using a plurality of different second deformation maps that have low-spatial frequency components. The plurality of deformation regions have different outlines. Here, the viscosity of a transparent material perception to be perceived by an observer can be adjusted by modulating at least one of the absolute values of the spatial frequency components of the second deformation maps and the amplitude of the second deformation maps in accordance with viscosity modulation information. Thus, the viscosity of the transparent material perception, as well as the color and the brightness of the transparent material perception, can be adjusted.

<Configuration>

Figure 4:
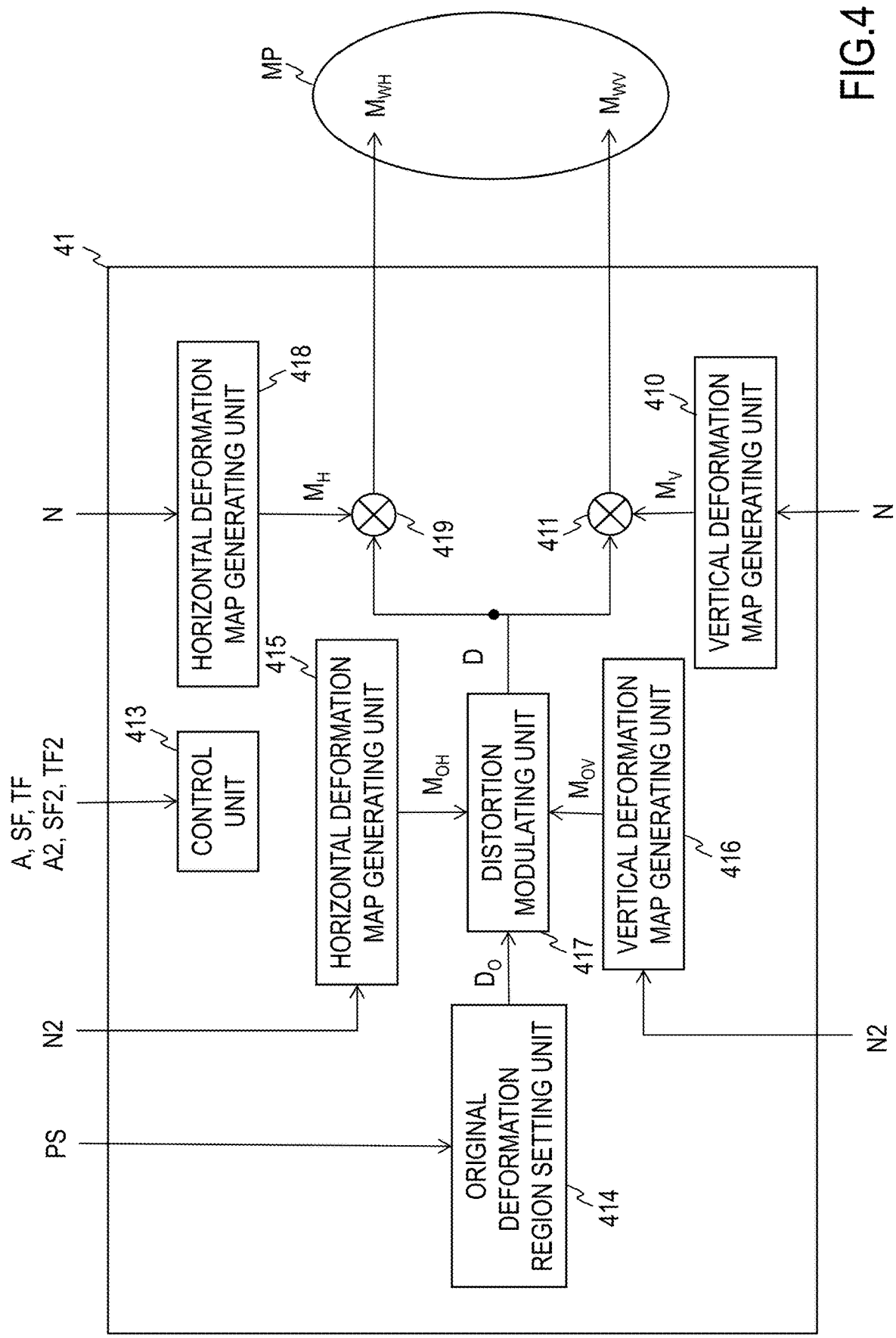
FIG. 4 is a block diagram showing an example of a functional configuration of a deformation map generating unit according to an embodiment.

As shown as an example in FIG. 1, a video generating device 4 according to this embodiment has a deformation map generating unit 41, a modulation region determining unit 12, a distortion modulating unit 43, a separating unit 14, a color modulating unit 15 (modulating unit), a brightness modulating unit 16 (modulating unit), an integrating unit 17, and a storing unit 18. As shown as an example in FIG. 4, the deformation map generating unit 41 has a control unit 413, an original deformation region setting unit 414, a horizontal deformation map generating unit 415, a vertical deformation map generating unit 416, a distortion modulating unit 417, a horizontal deformation map generating unit 418, a vertical deformation map generating unit 410, and multiplying units 411 and 419.

<Processing>

Next, processing according to this embodiment will be described. A difference between the fourth embodiment and the first to third embodiments only lies in that processing performed by the deformation map generating unit 11 is replaced by the following processing performed by the deformation map generating unit 41, and processing performed by the distortion modulating unit 13 is replaced by processing performed by the following processing performed by the distortion modulating unit 43. In the following, only processing performed by the deformation map generating unit 41 and the distortion modulating unit 43 will be described.

<Processing Performed by Deformation Map Generating Unit 41>

Three-dimensional noise images N and N2, amplitude information A and A2, spatial frequency information SF and SF2, temporal frequency information TF and TF2, and deformation region information PS are input to the control unit 413 of the deformation map generating unit 41 according to this embodiment. The amplitude information A2 and the spatial frequency information SF2 correspond to "viscosity modulation information". The three-dimensional noise image N2 is a noise image that has a time dimension and a two-dimensional spatial dimension. In other words, the three-dimensional noise image N2 has a plurality of two-dimensional noise images that serve as bases of deformation maps $M_O$ (second deformation maps) corresponding to a plurality of frames. The three-dimensional noise image N2 according to this embodiment includes a horizontal-direction noise image $N2_H$, which serves as a basis of the aforementioned "second horizontal-direction deformation maps", and a vertical-direction noise image $N2_V$, which serves as a basis of the "second vertical-direction deformation maps". Each pixel of the horizontal-direction noise image $N2_H$ and the vertical-direction noise image $N2_V$ is any of a positive value, a negative value, and a zero value. The size in the spatial dimension of the three-dimensional noise image N2 (the size in the spatial dimension of the horizontal-direction noise image $N2_H$ and the size of the vertical-direction noise image $N2_V$) according to this embodiment is the same as the size of the original image. Pixel values at each spatial position in the horizontal-direction noise image $N2_H$ and the vertical-direction noise image $N2_V$ may be independent from each other, or may be correlated with each other. Examples of the three-dimensional noise image N2 include a three-dimensional Gaussian noise image and three-dimensional white noise. The deformation region information PS according to this embodiment is information for specifying the spatial position and the shape of the original deformation region. The amplitude information A2 is information for operating the amplitude (the absolute value of the pixel value) of each element (pixel) of the deformation map $M_O$ corresponding to each frame. For example, the largest value of the amplitude of each pixel of the deformation map $M_O$ is determined based on the amplitude information A2. The spatial frequency information SF2 is information for operating the spatial frequency of the deformation map $M_O$. For example, the absolute values of the spatial frequency components included in the deformation map $M_O$ are determined based on the spatial frequency information SF2. An example of the spatial frequency information SF2 is information that defines the absolute values of the spatial frequency components included in the deformation map $M_O$ as being 3 cpd or less. For example, the cutoff frequency of a low-pass filter for the spatial dimension used when the deformation map $M_O$ is generated is determined in accordance with the spatial frequency information SF2. For example, the spatial frequency information SF2 specifies the cutoff frequency (e.g. 3 cpd or less) of the aforementioned low-pass filter for the spatial dimension. The temporal frequency information TF2 is information for operating the temporal frequency of a plurality of deformation maps $M_O$ corresponding to a plurality of frames (i.e. deformation maps $M_O$ corresponding to respective frames that constitute a video M and are arranged in time series). For example, the absolute values of temporal frequency components included in the plurality of deformation maps $M_O$ corresponding to the plurality of frames are determined based on the temporal frequency information TF2. An example of the temporal frequency information TF2 is information that defines the absolute values of the temporal frequency components of the plurality of deformation maps $M_O$ corresponding to the plurality of frames as being 8 Hz or less. For example, the cutoff frequency of a low-pass filter for the temporal dimension of the plurality of deformation maps $M_O$ corresponding to the plurality of frames is determined in accordance with the temporal frequency information TF2. For example, the temporal frequency information TF2 specifies the cutoff frequency (e.g. 8 Hz or less) of the aforementioned low-pass filter for the temporal dimension.

<Processing Performed by Original Deformation Region Setting Unit 414>

The original deformation region setting unit 414 receives input of the deformation region information PS, and outputs an original deformation region image $D_O$ that includes an original deformation region with a spatial position and a shape that are specified by the deformation region information PS. The original deformation region image $D_O$ is a two-dimensional array with the same size as the original image P. An example of the original deformation region image $D_O$ is a binary image in which the pixel values in the original deformation region are 1, and the pixel values in the other region are 0. Another example of the original deformation region image $D_O$ is a gray-scale image (intensity image) in which each pixel value belongs to a range from a predetermined minimum value (e.g. 0) to the maximum value (e.g. 1), and in which the absolute values of the pixel values in the original deformation region are greater than the absolute values of the pixel values in the other region. In other words, another example of the original deformation region image $D_O$ is a gray-scale image in which each pixel value belongs to a range from a predetermined minimum value (e.g. 0) to the maximum value (e.g. 1), the absolute values of the pixel values in the original deformation region is greater than or equal to a predetermined value, and the absolute values of the pixel values in the other region is smaller than this predetermined value. In this embodiment, one original deformation region image $D_O$ is shared by a plurality of frames. For this reason, at least one original deformation region image $D_O$ need only be generated to obtain one video M from the original image P. However, a plurality of original deformation region images $D_O$ may be generated for one video M. For example, the spatial position of the original deformation region may move between frames. For example, the original deformation region may move in at least any of the "rightward direction", the "leftward direction", the "downward direction", and the "upward direction" between a plurality of frames.

<Processing Performed by Horizontal Deformation Map Generating Unit 415 and Vertical Deformation Map Generating Unit 416>

The horizontal deformation map generating unit 415 and the vertical deformation map generating unit 416 generate, for each of the plurality of frames, a deformation map (second deformation map) $M_O=(M_{OH}, N_{OV})$ for deforming the outline of the original deformation region in the original deformation region image $D_O$, and outputs the generated deformation map. The deformation map $M_O$ has a horizontal-direction deformation map $M_{OH}$ (a second horizontal-direction deformation map) for modulating, in the horizontal direction, pixels deriving from the original deformation region in the deformation region image $D_O$ (a horizontal-direction deformation map for deforming, in the horizontal direction, the outline of the original deformation region in the deformation region image $D_O$), and a vertical-direction deformation map $N_{OV}$ (a second vertical-direction deformation map) for modulating these pixels in the vertical direction (a vertical-direction deformation map for deforming, in the vertical direction, the outline of the original deformation region in the deformation region image $D_O$). A plurality of horizontal-direction deformation maps $M_{OH}$ corresponding to the plurality of frames (i.e. the horizontal-direction deformation maps $M_{OH}$ corresponding to respective frames that constitute the video M and are arranged in time series) differ from each other, and a plurality of vertical-direction deformation maps $N_{OV}$ corresponding to a plurality of frames (i.e. the vertical-direction deformation maps $N_{OV}$ corresponding to the respective frames that constitute the video M and are arranged in time series) differ from each other. The horizontal-direction deformation maps $M_{OH}$ generated for some of the plurality of frames may be the same, and the vertical-direction deformation maps $N_{OV}$ generated for some of the plurality of frames may be the same. Each horizontal-direction deformation map $M_{OH}$ and each vertical-direction deformation maps $N_{OV}$ are two-dimensional arrays with the same size as the original deformation region image $D_O$. In the horizontal-direction deformation maps $M_{OH}$, values indicating a horizontal moving direction and a moving amount of the respective pixels deriving from the deformation region image $D_O$ are used pixel values of the pixels. In the vertical deformation maps $N_{OV}$, values indicating a vertical moving direction and a moving amount of the respective pixels deriving from the deformation region image $D_O$ are used as pixel values of the pixels. For example, the positive or negative sign of each pixel value in the horizontal-direction deformation maps $M_{OH}$ and the vertical-direction deformation maps $N_{OV}$ indicates a moving direction, and the absolute value of each pixel value indicates the moving amount (moving pixel number). The position of each of the pixels deriving from the deformation region image $D_O$ is the same as the position of a pixel of the horizontal-direction deformation maps $M_{OH}$ the vertical-direction deformation maps $N_{OV}$, the pixel indicating the moving direction and the moving amount of the pixel deriving from the deformation region image $D_O$. Pixel values at each spatial position in the horizontal-direction deformation maps $M_{OH}$ and the vertical-direction deformation maps $N_{OV}$ may be independent from each other, or may be correlated with each other. Also, the horizontal-direction deformation maps $M_{OH}$ and the vertical-direction deformation maps $N_{OV}$ have low-spatial frequency components.

The horizontal deformation map generating unit 415 receives input of the horizontal-direction noise image $N2_H$ included in the three-dimensional noise image N2, generates the horizontal-direction deformation maps $M_{OH}$, and outputs the generated horizontal-direction deformation maps $M_{OH}$. The vertical deformation map generating unit 416 receives input of the vertical-direction noise image $N2_V$ included in the three-dimensional noise image N2, generates the vertical-direction deformation maps $N_{OV}$, and outputs the generated vertical-direction deformation maps $N_{OV}$. The horizontal deformation map generating unit 415 and the vertical deformation map generating unit 416 generate the horizontal-direction deformation maps $M_{OH}$ and the vertical-direction deformation maps $N_{OV}$ corresponding to the plurality of frames, using, for example, the method described in Patent Literature 1, Reference Literature 1, or the like, and outputs the generated horizontal-direction deformation maps $M_{OH}$ and the vertical-direction deformation maps $N_{OV}$. For example, the horizontal deformation map generating unit 415 converts the horizontal-direction noise image $N2_H$ included in the three-dimensional noise image N2 to a spatial frequency domain, filters the spatial frequency domain using a low-pass filter (e.g. a low-pass filter with a cutoff frequency of 3 cpd or less) for the spatial dimension that is based on the spatial frequency information SF2 and then returns the filtered spatial frequency domain to a spatial region, and further normalizes the spatial region to obtain a plurality of horizontal-direction deformation maps $M_{OH}$ corresponding to the plurality of frames. For example, the vertical deformation map generating unit 416 converts the vertical-direction noise image $N2_V$ included in the three-dimensional noise image N2 to a spatial frequency domain, filters the spatial frequency domain using a low-pass filter (e.g. a low-pass filter with a cutoff frequency of 3 cpd or less) for the spatial dimension that is based on the spatial frequency information SF2 and then return the filtered spatial frequency domain to a spatial region, and further normalizes the spatial region to obtain a plurality of vertical-direction deformation maps $M_{OV}$ corresponding to the plurality of frames. When performing the normalization, the horizontal deformation map generating unit 415 may also adjust the amplitude of the horizontal-direction deformation maps $M_{OH}$ based on the amplitude information A2. Similarly, when performing the normalization, the vertical deformation map generating unit 416 may also adjust the amplitude of the vertical-direction deformation maps $M_{OV}$ based on the amplitude information A2. Also, the horizontal deformation map generating unit 415 and the vertical deformation map generating unit 416 may filter the horizontal-direction noise image $N2_H$ and the vertical-direction noise image $N2_V$ in the temporal dimension using a low-pass filter (e.g. a low-pass filter with a cutoff frequency of 8 Hz or less) for the temporal dimension that is based on the temporal frequency information TF2, and then convert these horizontal-direction noise image $N2_H$ and vertical-direction noise image $N2_V$ to the spatial frequency domains. Thus, the temporal change in the temporally adjacent horizontal-direction deformation maps $M_{OH}$ and vertical-direction deformation maps $N_{OV}$ becomes smoother.

<Processing Performed by Distortion Modulating Unit 417>

Figure 5:
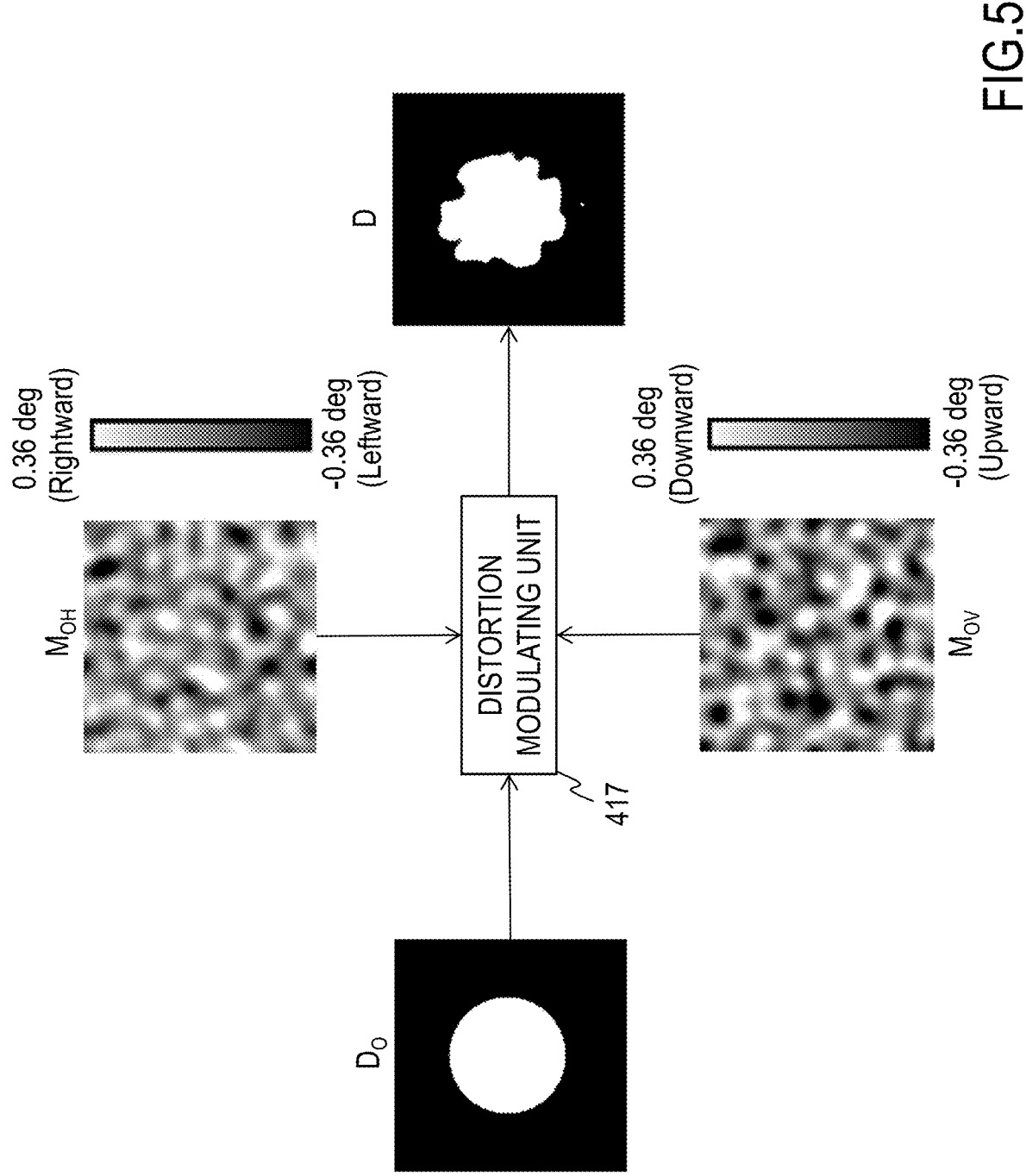
FIG. 5 is a diagram for illustrating a video generating method according to an embodiment.

The original deformation region image $D_O$ and the horizontal-direction deformation maps $M_{OH}$ and the vertical-direction deformation maps $N_{OV}$ for the plurality of frames are input to the distortion modulating unit 417. The distortion modulating unit 417 deforms, for the respective frames, the original deformation region image $D_O$ using an image warping method (e.g. see Patent Literature 1, Reference Literature 1 etc.) based on the horizontal-direction deformation maps $M_{OH}$ and the vertical-direction deformation maps $N_{OV}$, and outputs the thus-obtained deformation region image D (FIG. 5). That is to say, the distortion modulating unit 417 moves, for the respective frames, pixels deriving from the original deformation region image $D_O$ in the horizontal direction based on the deformation maps $M_{OH}$, moves the pixels deriving from the original deformation region image $D_O$ in the vertical direction based on the vertical-direction deformation maps $N_{OV}$, and thus obtains and outputs the deformation region image D. For example, the deformation region image D for the top frame $f_0$ is the original deformation region image $D_O$, and the deformation region image D for the second or subsequent frame $f_i$ is an image obtained by deforming the deformation region image D for the immediately previous frame using the deformation map $M_O=(M_{OH}, M_{OV})$ for the frame $f_i$. Thus, the distortion modulating unit 417 obtains a plurality of deformation region images D corresponding to the plurality of frames (i.e. deformation region images D corresponding to the respective frames that constitute the video M and are arranged in time series), and outputs the obtained deformation region images D. As mentioned above, the deformation region image D obtained for each of the frames includes a deformation region obtained by deforming the outline of the original deformation region in the original deformation region image $D_O$ using the horizontal-direction deformation map $M_{OH}$ and the vertical-direction deformation map $N_{OV}$. That is to say, the plurality of thus-obtained deformation regions are obtained by deforming the outline of the original deformation region using a plurality of different horizontal-direction deformation maps $M_{OH}$ and vertical-direction deformation maps $N_{OV}$ that have low-spatial frequency components. The deformation region image D is a two-dimensional array with the same size as the original image P.

<Processing Performed by Horizontal Deformation Map Generating Unit 418 and Vertical Deformation Map Generating Unit 410>

First, the horizontal deformation map generating unit 418 and the vertical deformation map generating unit 410 obtain a deformation map $M2=(M_H, M_V)$ (FIGS. 6A and 6B) for deforming pixels deriving from the original image P for each frame, using the three-dimensional noise image N, the amplitude information A, the spatial frequency information SF, the temporal frequency information TF, and the deformation region information PS. The deformation map M2 has a plurality of horizontal-direction deformation maps $M_H$ for modulating the pixels deriving from the original image P in the horizontal direction, and a plurality of vertical-direction deformation maps $M_V$ for modulating these pixels in the vertical direction. In the horizontal-direction deformation maps $M_{WH}$ and the vertical-direction deformation map $M_{WV}$ described in the first embodiment, the absolute value has a value that is zero or more only in the deformation region, and the absolute value has a zero value in the other region. Meanwhile, in the horizontal-direction deformation maps $M_H$ and the vertical-direction deformation maps $M_V$, the absolute value has a value that is zero or more in all regions. As for the other points, the horizontal-direction deformation maps $M_H$ are the same as the horizontal-direction deformation maps $M_{WH}$, and the vertical-direction deformation maps $M_V$ are the same as the vertical-direction deformation maps $M_{WV}$. For example, the horizontal deformation map generating unit 418 and the vertical deformation map generating unit 410 convert the horizontal-direction noise image $N2_H$ and the vertical-direction noise image $N2_V$ included in the three-dimensional noise image N2 to spatial frequency domains, filter the spatial frequency domains using a low-pass filter (e.g. a low-pass filter with a cutoff frequency of 3 cpd or less) for the spatial dimension that is based on the spatial frequency information SF and then return the spatial frequency domains to spatial regions, further normalize the spatial regions, and thus obtain a plurality of horizontal-direction deformation maps $M_H$ corresponding to the plurality of frames (i.e. horizontal-direction deformation maps $M_H$ corresponding to the respective frames that constitute the video M and are arranged in time series) and vertical-direction deformation maps $M_V$ (i.e. vertical-direction deformation maps $M_V$ corresponding to the respective frames that constitute the video M and are arranged in time series). When performing the normalization, the horizontal deformation map generating unit 418 and the vertical deformation map generating unit 410 may also adjust the amplitude of the horizontal-direction deformation maps $M_H$ and the vertical-direction deformation maps $M_V$ based on the amplitude information A. Also, the horizontal deformation map generating unit 418 and the vertical deformation map generating unit 410 may filter the horizontal-direction noise image $N2_H$ and the vertical-direction noise image $N2_V$ in the temporal dimension using a low-pass filter (e.g. a low-pass filter with a cutoff frequency of 8 Hz or less) for the temporal dimension that is based on the temporal frequency information TF, and then convert these horizontal-direction noise image $N2_H$ and vertical-direction noise image $N2_V$ to spatial frequency domains. Thus, the horizontal-direction deformation maps $M_H$ and the vertical-direction deformation maps $M_V$ for smoothly changing the pixel values of the deformation region between frames can be obtained. Note that it is desirable that the cutoff frequency of the low-pass filter for the temporal dimension for obtaining the deformation maps $M^2=(M_H, M_V)$ is the same as or close to the cutoff frequency of the aforementioned low-pass filter for the spatial dimension for obtaining the deformation map $M_O=(M_{OH}, M_{OV})$. That is to say, it is desirable that the deformation maps $M_O=(M_{OH}, M_{OV})$ mainly include spatial frequency components with absolute values of the spatial frequency that are smaller than or equal to a first value, the deformation maps $M^2=(M_H, M_V)$ mainly include spatial frequency components with absolute values of the spatial frequency that are smaller than or equal to a second value, and the first value is equal to or appropriate to the second value. This is because, if these values significantly differ from each other, there is a possibility that a desired perception that the video M is to make an observer perceive cannot be perceived. However, they may differ from each other if a desired perception that the video M is to make an observer to perceive can be perceived.

<Processing Performed by Multiplying Units 419 and 411>

Figure 6A:
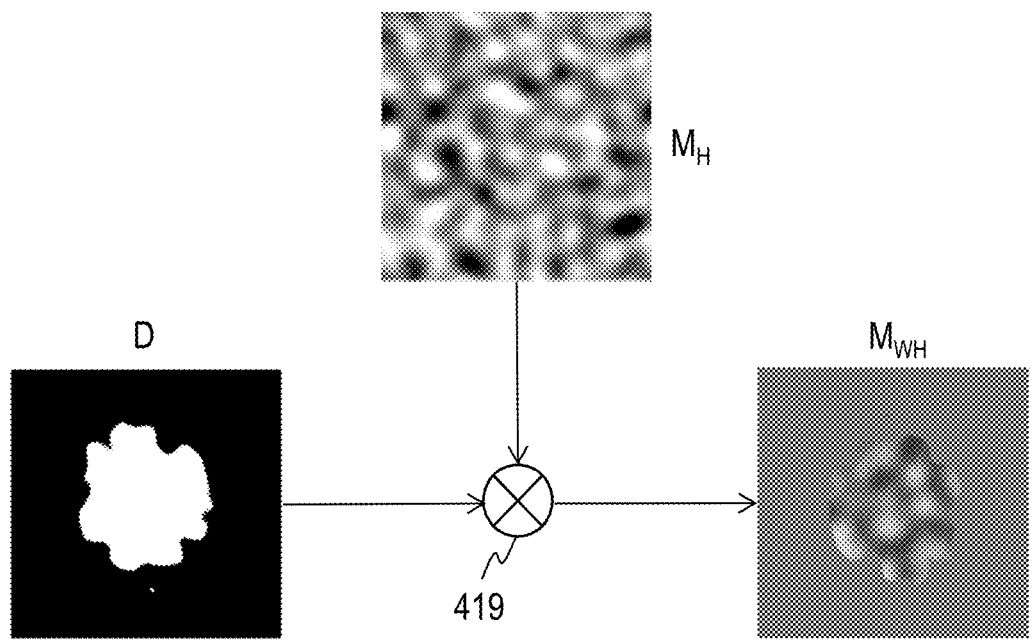
FIGS. 6A and 6B are diagrams for illustrating a video generating method according to a third embodiment.

The multiplying unit 419 receives input of the deformation region image D and the horizontal-direction deformation map $M_H$ for each frame, generates, for the frame, a horizontal-direction deformation map $M_{WH}$ obtained by weighting the horizontal-direction deformation map $M_H$ with the deformation region image D as follows, and outputs the generated horizontal-direction deformation map $M_{WH}$ (FIG. 6A).

$$M_{WH}=M_H \times D$$

That is to say, values obtained by multiplying pixel values of pixels (x, y) of the horizontal-direction deformation map $M_H$ by pixel values of pixels (x, y) of the deformation region image D is used as pixel values of pixels (x, y) of the horizontal-direction deformation map $M_{WH}$. If the spatial position of the original deformation region moves between frames, the deformation region in the horizontal-direction deformation maps $M_{WH}$ also moves. For example, if, in a plurality of frames, the spatial position of the original deformation region moves in at least any of the "rightward direction", the "leftward direction", the "downward direction", and the "upward direction", the deformation region in the horizontal-direction deformation maps $M_{WH}$ also moves in at least any of the "rightward direction", the "leftward direction", the "downward direction", and the "upward direction".

Figure 6B:
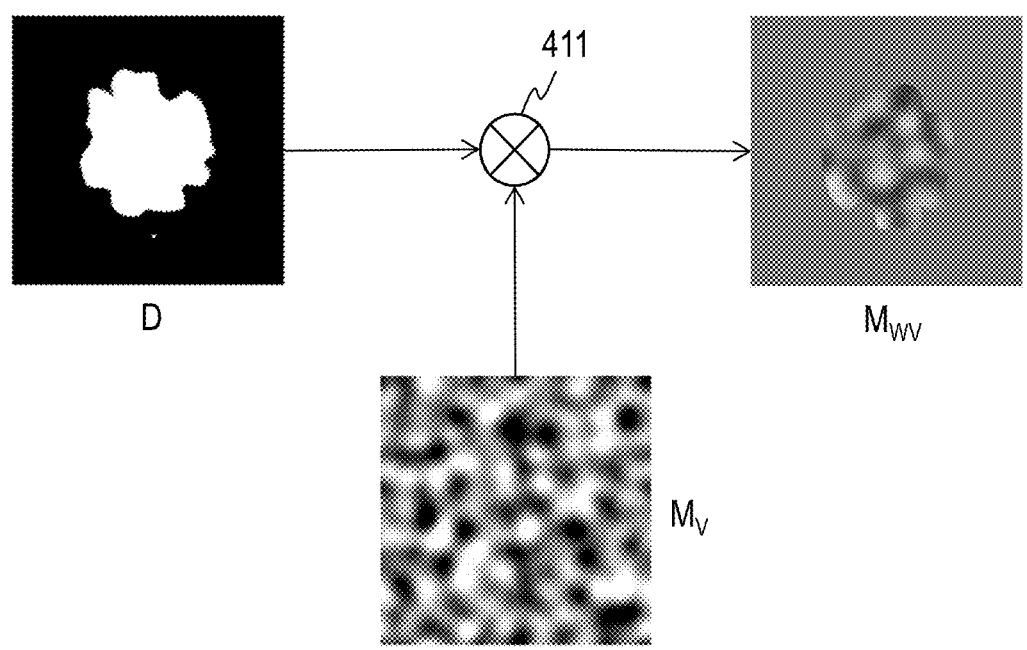

The multiplying unit 411 receives input of the deformation region image D and the vertical-direction deformation map $M_V$ for each frame, generates, for the frame, a vertical-direction deformation map $M_{WV}$ obtained by weighting the vertical-direction deformation map $M_V$ with the deformation region image D as follows, and outputs the generated vertical-direction deformation map $M_{WV}$ (FIG. 6B).

$$M_{WV} = M_V \times D$$

That is to say, values obtained by multiplying pixel values of pixels (x, y) of the vertical-direction deformation map $M_V$ by pixel values of pixels (x, y) of the vertical-direction deformation region image D are used as pixels values of pixels (x, y) of the vertical-direction deformation map M. For example, if, in a plurality of frames, the spatial position of the original deformation region moves in at least any of the "rightward direction", the "leftward direction", the "downward direction", and the "upward direction", the deformation region in the vertical-direction deformation maps $M_{WV}$ also moves in at least any of the "rightward direction", the "leftward direction", the "downward direction", and the "upward direction". A plurality of deformation maps MP=($M_{WH}$, $M_{WV}$) corresponding to a plurality of frames that are obtained as described above (i.e. deformation maps MP corresponding to the respective frames that constitute the video M and are arranged in time series) are sent to the distortion modulating unit 43.

<Processing Performed by Distortion Modulating Unit 43>

An original image P, and a plurality of deformation maps MP=($M_{WH}$, $M_{WV}$) (a plurality of different deformation maps that have elements corresponding to respective pixels deriving from the original image P, the elements indicating a moving direction and a moving amount of the respective pixels, and that have low-spatial frequency components) corresponding to a plurality of frames output from the deformation map generating unit 41 are input to the distortion modulating unit 43. For example, similarly to the distortion modulating unit 13 in the first embodiment, the distortion modulating unit 43 moves the pixels deriving from the original image P in a moving direction by a moving amount, the moving direction and the moving amount being specified by the elements of the deformation maps MP=($M_{WH}$, $M_{WV}$) that correspond to the respective pixels, using the deformation maps MP=($M_{WH}$, $M_{WV}$) for the respective frames, to obtain modulated images P1 for the respective frames. Alternatively, similarly to the distortion modulating unit 13 in the first embodiment, the distortion modulating unit 43 may move, using the deformation maps MP=($M_{WH}$, $M_{WV}$) for the respective frames, the pixels deriving from the original image P in a moving direction by a moving amount, the moving direction and the moving amount being specified by the elements of the deformation maps MP=($M_{WH}$, $M_{WV}$) that correspond to the respective pixels, obtain modulated images P1' for the respective frames, and output, as the modulated images P1, images obtained by multiplying the modulated images P1' by a window function W. The window function W is for hiding images around outer peripheries (side edges and outer frame) of the modulated images P1'. If the outer peripheries of the modulated image P1' are deformed due to modulation using the deformation maps MP, the shape of the modulated images P1' itself will be distorted. The window function W is used to hide such a distortion on the outer peripheries of the modulated images P1'. The window function W is a function that takes a value of 0 at coordinates around the outer peripheries of the modulated images P1', and takes a value of 1 at the other coordinates, for example. The change of the window function W from 0 to 1 may be smooth. The distortion modulating unit 43 may also multiply, for the respective frames, the modulated images P1' by the window function W as follows, thus obtain and output the modulated images P1.

$$P1 = W \times P1'$$

Other processing is as described in the first embodiment.

Characteristics of this Embodiment

An observer who sees the video M is given the illusion that a substance with a transparent material perception that has the color corresponding to the color modulation information CM and/or the brightness corresponding to the brightness modulation information LM is disposed in a region between the original image P and the observer. Generation of this video M does not require complex image processing techniques. In addition, since color components and brightness components of the video M can be operated independently, the color and the brightness of the transparent material perception can be operated independently. Furthermore, in this embodiment, the viscosity of the substance with a transparent material to be perceived can also be operated.

For example, the viscosity of a substance of a transparent material to be perceived can be operated as a result of the horizontal deformation map generating unit 415 and the vertical deformation map generating unit 416 operating the absolute values of the spatial frequency components of the horizontal-direction deformation maps $M_{OH}$ and the vertical-direction deformation maps $M_{OV}$ (second deformation maps) based on the spatial frequency information SF2 (viscosity modulation information). For example, if a liquid expression with a high viscosity and a slow wavefront change is to be given to the original image P, the cutoff frequency of the low-pass filter for the spatial dimension that is based on the spatial frequency information SF2 is lowered. Conversely, if a liquid expression with a low viscosity and a fast wavefront change is to be given to the original image P, this cutoff frequency is raised. That is to say, the horizontal-direction deformation maps $M_{OH}$ and the vertical-direction deformation maps $N_{OV}$ in the case of generating a video M for expressing the perception of a first substance include spatial frequency components higher than those of the horizontal-direction deformation maps $M_{OH}$ and the vertical-direction deformation maps $N_{OV}$ in the case of generating the video M for expressing the perception of a second substance, and the viscosity of the first substance is lower than the viscosity of the second substance.

Figure 7:
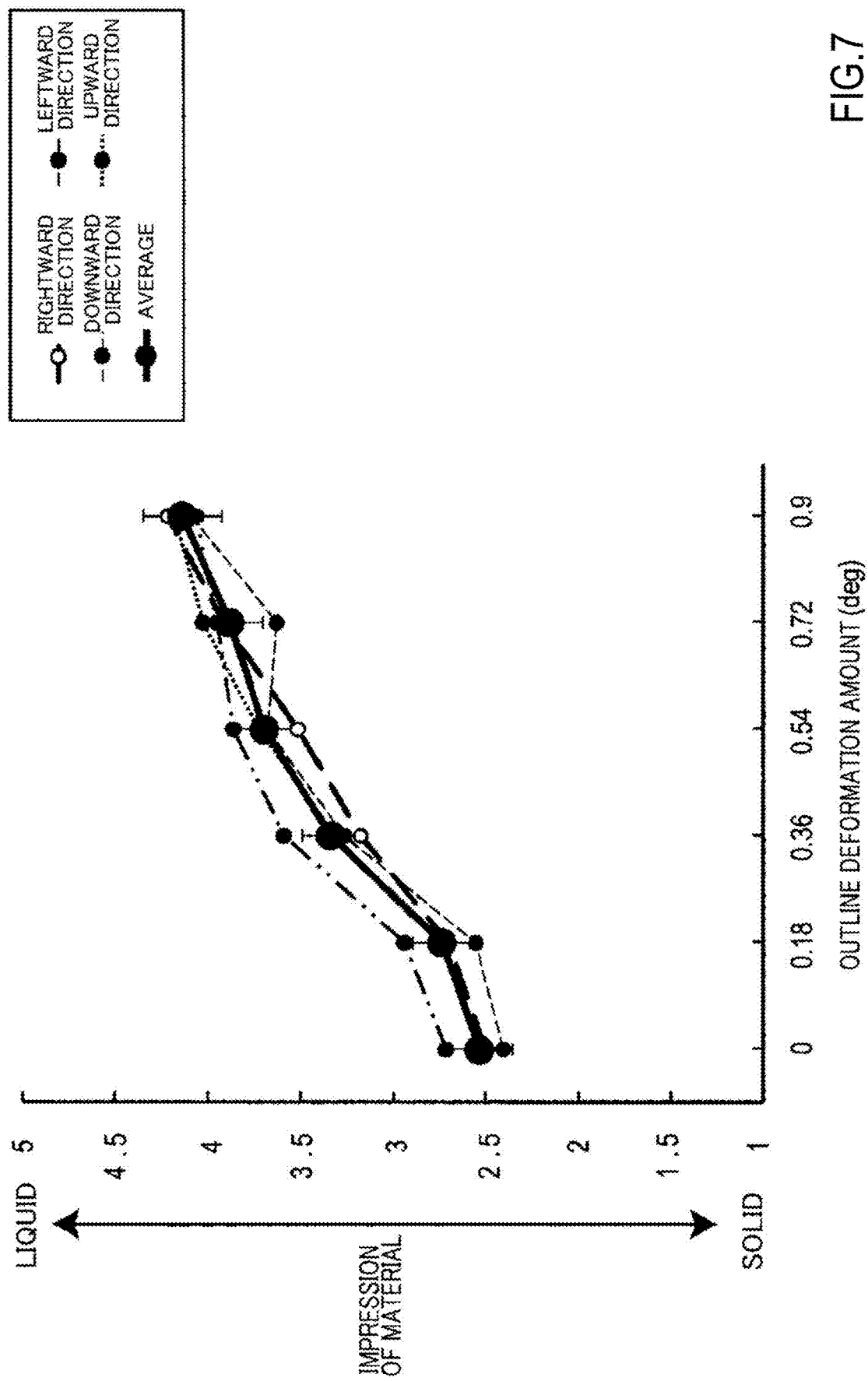
FIG. 7 is a diagram showing an example of the relationship between the deformation amount, i.e. the amount by which an outline of a deformation region is deformed, and the impression of a material.

For example, the viscosity of a substance of a transparent material to be perceived can be operated as a result of the horizontal deformation map generating unit 415 and the vertical deformation map generating unit 416 operating the amplitude of the horizontal-direction deformation maps $M_{OH}$ and the vertical-direction deformation maps $N_{OV}$ (second deformation maps) based on the amplitude information A2 (viscosity modulation information). FIG. 7 shows an example of the relationship between the outline deformation amount, namely the amount by which the outline of the original deformation region is deformed, and subjective evaluation of ultimately-obtained videos M by test participants. The horizontal axis in FIG. 7 indicates the outline deformation amount (deg) of the original deformation region, and the vertical axis indicates the impression of the material received from the videos M by the test participants. In FIG. 7, the outline deformation amount of the original deformation region is expressed by the angle (deg) formed between the outline of the original deformation region and the outline of the deformation region that has been deformed, as viewed from the positions of the test participants' eyes. The condition under which the deformation region moves in the rightward direction as viewed from the test participants, the condition under which the deformation region moves in the leftward direction, the condition under which the deformation region moves in the downward direction, the condition under which the deformation region moves in the upward direction, and the average value of data obtained in the respective directions are denoted as "rightward direction", "leftward direction", "downward direction", "upward direction", and "average", respectively. The vertical axis in FIG. 7 indicates the average value of the subjective evaluation of the impression of the material received by the test participants from videos M that are obtained based on the deformation region with the respective outline deformation amounts. The subjective evaluation is five-grade evaluation expressed by values of 1 to 5, a subjective evaluation value that is closer to 1 indicates that a test participant perceives that the impression is more like a solid, and a subjective evaluation that is closer to 5 indicates that a test participant perceives that the impression is more like a liquid. There were 10 test participants, and an error bar is denoted as ±1SEM. As shown as an example in FIG. 7, the larger the outline deformation amount is, the more the test participants receive a liquid-like impression from a video M, and the smaller the outline deformation amount is, the more the test participants receive a solid-like impression from a video M. Here, the larger the amplitude of the horizontal-direction deformation maps $M_{OH}$ and the vertical-direction deformation maps $N_{OV}$ is, the larger the outline deformation amount of the original deformation region to be deformed using the vertical-direction deformation maps $M_{OH}$, $N_{OV}$ is. Thus, it can be understood that the smaller the amplitude of the horizontal-direction deformation maps $M_{OH}$ and the vertical-direction deformation maps $N_{OV}$ is, a video M can be generated that causes a more solid-like visual perception, and the larger the amplitude of the horizontal-direction deformation maps $M_{OH}$ and the vertical-direction deformation maps $N_{OV}$ is, a video M can be generated that causes a more liquid-like visual perception. Based on the above results, the amplitude of the horizontal-direction deformation maps $M_{OH}$ and the vertical-direction deformation maps $N_{OV}$ can be reduced when a video M is to be generated that causes a solid-like impression, and the amplitude of the horizontal-direction deformation maps $M_{OH}$ and the vertical-direction deformation maps $N_{OV}$ can be increased when a video M is to be generated that causes a liquid-like impression. That is to say, the average amplitude of the horizontal-direction deformation maps $M_{OH}$ and the vertical-direction deformation maps $N_{OV}$ in the case of generating a video M for expressing a solid perception is smaller than the average amplitude of the horizontal-direction deformation maps $M_{OH}$ and the vertical-direction deformation maps $N_{OV}$ in the case of generating a video M for expressing a liquid perception, and/or the largest amplitude of the horizontal-direction deformation maps $M_{OH}$ and the vertical-direction deformation maps $N_{OV}$ in the case of generating a video M for expressing a solid perception is smaller than the largest amplitude of the horizontal-direction deformation maps $M_{OH}$ and the vertical-direction deformation maps $M_{OV}$ in the case of generating a video M for expressing a liquid perception.

Note that a configuration may also be employed in which information indicating the deformation region image D is input to the modulation region determining units 12 and 22, and the modulation region determining units 12 and 22 obtain modulation region information R indicating the spatial position and the shape of a modulation region whose color and brightness are to be adjusted, using the information indicating the deformation region image D and output the obtained modulation region information R. For example, the modulation region determining unit 12 may also obtain the modulation region information R indicating the same spatial position and shape as those of the deformation region indicated by the deformation region image D. For example, the modulation region determining unit 22 may also obtain the modulation region information R indicating the spatial position and the shape of the modulation region, based on the information regarding the deformation region indicated by the deformation region image D and the modulation region information S.

Variation of Fourth Embodiment

The modulation region determining unit 12 according to the fourth embodiment may be replaced by the above-described modulation region determining unit 22 or 32.

Fifth Embodiment

In the fourth embodiment, the outline of the deformation region is deformed, and a desired perception of a transparent material is caused to be perceived. In the fifth embodiment, a desired perception of a transparent material is caused to be perceived by blurring the outline of the deformation region (reducing the sharpness of the outline) instead.

<Configuration>

Figure 8:
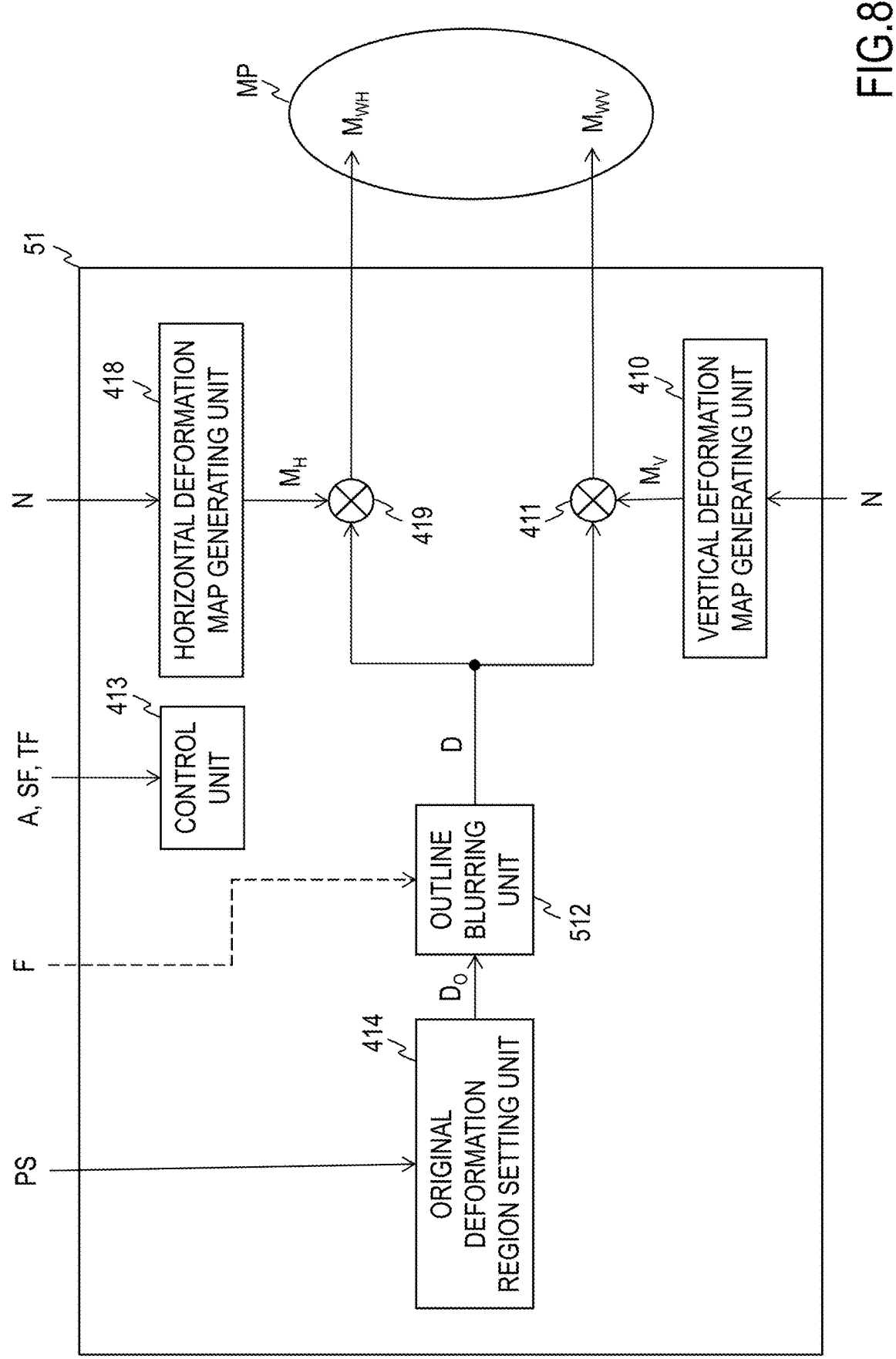
FIG. 8 is a block diagram showing an example of a functional configuration of a deformation map generating unit according to an embodiment.

As shown as an example in FIG. 1, a video generating device 5 according to this embodiment has a deformation map generating unit 51, a modulation region determining unit 12, a distortion modulating unit 13, a separating unit 14, a color modulating unit 15 (modulating unit), a brightness modulating unit 16 (modulating unit), an integrating unit 17, and a storing unit 18. As shown as an example in FIG. 8, the deformation map generating unit 51 has a control unit 413, an original deformation region setting unit 414, an outline blurring unit 512, a horizontal deformation map generating unit 418, a vertical deformation map generating unit 410, and multiplying units 411 and 419.

<Processing>

A difference between the fifth embodiment and the fourth embodiment lies in that processing is performed by the outline blurring unit 512, instead of processing performed by the horizontal deformation map generating unit 415, the vertical deformation map generating unit 416, and the distortion modulating unit 417. Other features are as described in the fourth embodiment. In the following, only the processing performed by the outline blurring unit 512, which is the difference from the fourth embodiment, will be described.

<Processing Performed by Outline Blurring Unit 512>

The original deformation region image $D_O$ output from the original deformation region setting unit 414 and blurring degree information F (viscosity modulation information), which indicates the degree of blurring of the outline of the original deformation region, are input to the outline blurring unit 512. The outline blurring unit 512 obtains a deformation region image D that includes a deformation region, which is obtained by blurring the outline of the original deformation region (reducing the sharpness of the outline of the original deformation region) in the original deformation region image $D_O$ in accordance with the blurring degree information F, and outputs the obtained deformation region image D. The deformation region image D is a two-dimensional array with the same size as the original image P. For example, the outline blurring unit 512 may output, as the deformation region image D, an image obtained by applying a Gaussian filter to the original deformation region image $D_O$, or may output, as the deformation region image D, an image obtained by applying a low-pass filter to the original deformation region image $D_O$. The blurring amount of the outline of the original deformation region in the original deformation region image $D_O$ differs depending on the value indicated by the blurring degree information F. For example, if an image obtained by applying a Gaussian filter to the outline of the original deformation region image $D_O$ is used as the deformation region image D, the outline blurring unit 512 changes the filter size of the Gaussian filter in accordance with the value indicated by the blurring degree information F, for example. For example, if an image obtained by applying a low-pass filter to the original deformation region image $D_O$ is used as the deformation region image D, the outline blurring unit 512 changes the cutoff frequency in accordance with the value indicated by the blurring degree information F, for example.

Characteristics of this Embodiment

An observer who sees the video M is given the illusion that a substance with a transparent material perception that has the color corresponding to the color modulation information CM and/or the brightness corresponding to the brightness modulation information LM is disposed in a region between the original image P and the observer. Generation of this video M does not require complex image processing techniques. In addition, since color components and brightness components of the video M can be operated independently, the color and the brightness of the transparent material perception can be operated independently. Furthermore, in this embodiment, the viscosity of the substance of a transparent material to be perceived can also be operated by operating the blurring amount of the outline of the original deformation region.

Figure 9:
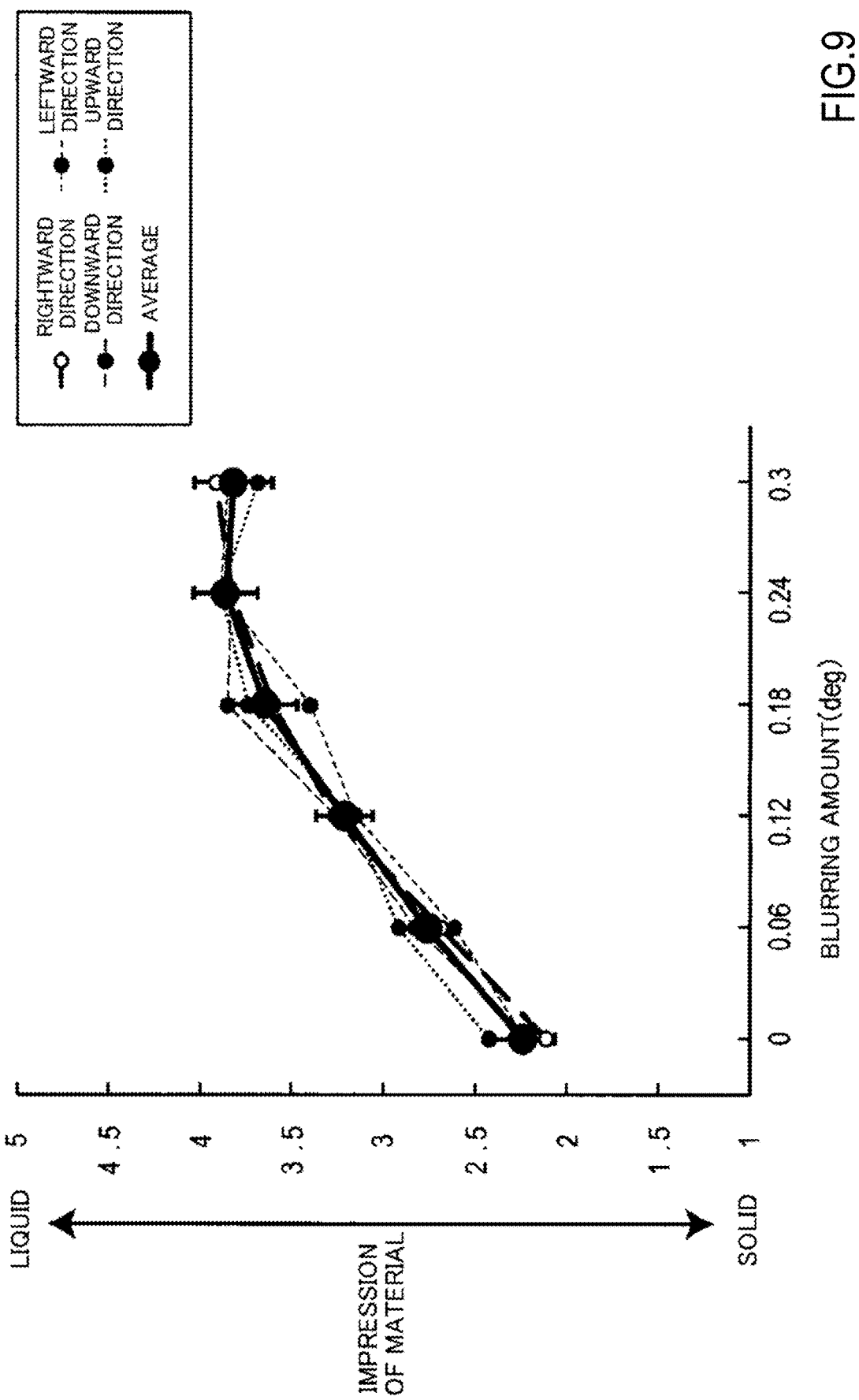
FIG. 9 is a diagram showing an example of the relationship between the blurring amount, i.e. the amount by which an outline of a deformation region is blurred, and the impression of a material.

FIG. 9 shows an example of the relationship between the blurring amount of the outline of the deformation region and the subjective evaluation of ultimately-obtained videos M by test participants. The horizontal axis in FIG. 9 indicates the blurring amount (deg) of the outline of the deformation region. In FIG. 9, the blurring amount of the outline of the deformation region is expressed by a standard deviation of a spatial Gaussian filter that was used for the blurring. This amount is expressed by the angle (deg) formed between the filter center coordinates and the coordinates that are distant therefrom by the standard deviation when this filter is viewed from the positions of the test participants' eyes. The condition under which the deformation region moves in the rightward direction as viewed from the test participants, the condition under which the deformation region moves in the leftward direction, the condition under which the deformation region moves in the downward direction, the condition under which the deformation region moves in the upward direction, and the average value of data obtained in the respective directions are expressed as "rightward direction", "leftward direction", "downward direction", "upward direction", and "average", respectively. The vertical axis in FIG. 9 indicates the average value of the subjective evaluation values of the impression of the material received by the test participants from videos M that are obtained based on the deformation region with the respective blurring amounts. The subjective evaluation is five-grade evaluation expressed by values of 1 to 5, a subjective evaluation value that is closer to 1 indicates that a test participant perceives that the impression is more like a solid, and a subjective evaluation that is closer to 5 indicates that a test participant perceives that the impression is more like a liquid. There were 10 test participants, and an error bar is denoted as ±1SEM. As shown as an example in FIG. 9, the larger the blurring amount of the outline of the deformation region is, the more the test participants receive a liquid-like impression from a video M, and the smaller the blurring amount of the outline of the deformation region is, the more the test participants receive a solid-like impression from a video M. For this reason, the blurring amount of the outline of the deformation region can be reduced when a video M is to be created that causes a solid-like visual perception, and the blurring amount of the outline of the deformation region can be increased when a video M is to be created that causes a liquid-like visual perception. That is to say, the blurring amount of the outline of the deformation region when a video M for expressing the perception of a solid is generated is smaller than the blurring amount of the outline of the deformation region when a video M for expressing the perception of a liquid is generated.

Variation of Fifth Embodiment

The modulation region determining unit 12 according to the fifth embodiment may be replaced by the above-described modulation region determining unit 22 or 32.

[Other Variations Etc.]

Figure 10:
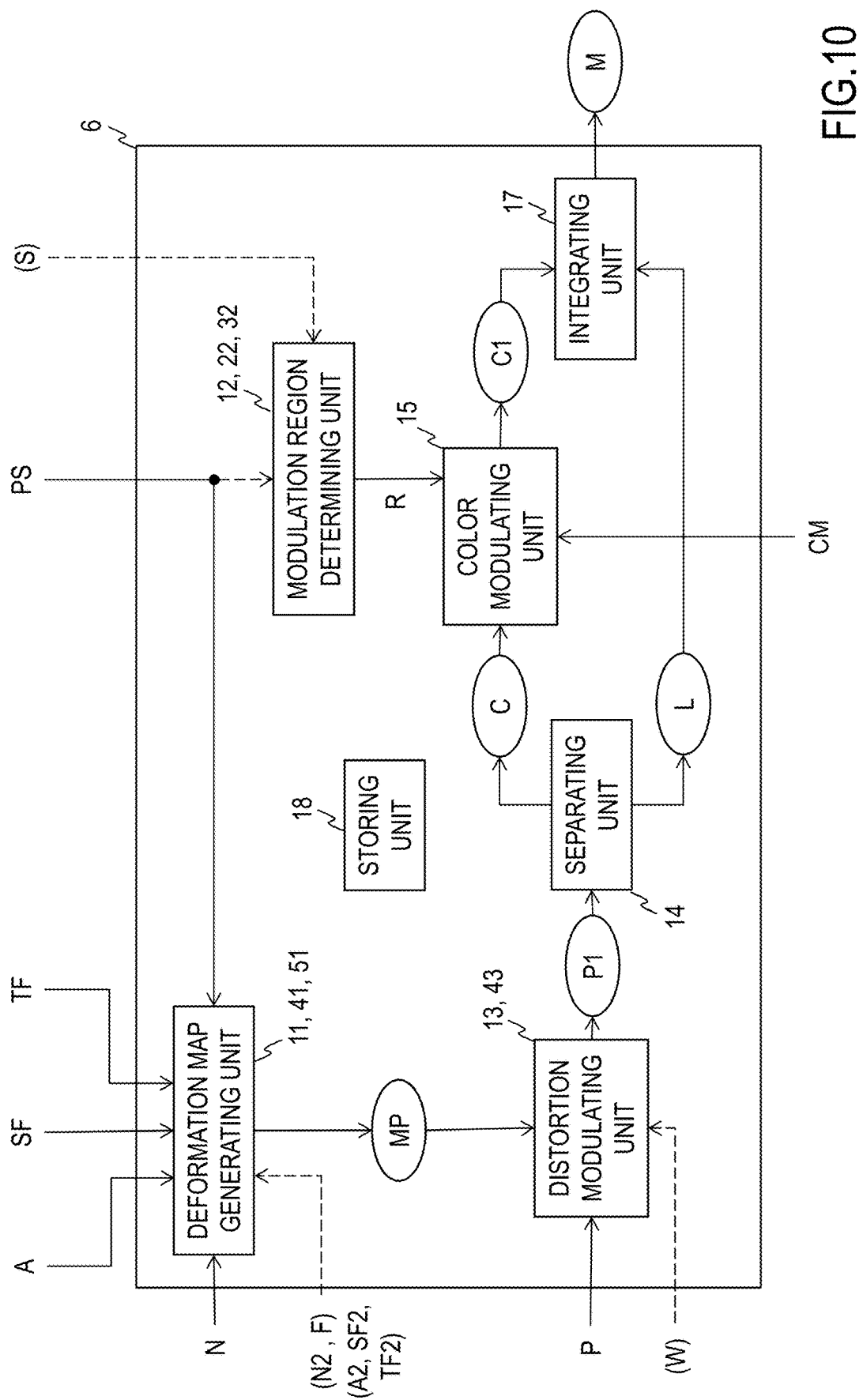
FIG. 10 is a block diagram showing an example of a functional configuration of a video generating device according to embodiments.

Note that the present invention is not limited to the above embodiments. For example, as in a video generating device 6, which is shown as an example in FIG. 10, the brightness modulating unit 16 may be omitted from the video generating devices according to the first to fifth embodiments and variations thereof. In this case, only color modulation can be performed. That is to say, this video generating device 6, using the plurality of different deformation maps, moves the pixels deriving from the original image P in a moving direction by a moving amount, the moving direction and the moving amount being specified by the elements corresponding to the respective pixels, obtains the plurality of modulated images P1, separates the plurality of modulated images P1 into brightness components and color components to obtain a plurality of brightness component images L and color component images C, obtains the plurality of color-modulated images C1, which are obtained by modulating the color of the plurality of color component images C in accordance with the color modulation information CM, obtains a video M configured by temporally arranging a plurality of integrated images, which are obtained by integrating the brightness component images L and the color-modulated images C1, and outputs the obtained video M.

Figure 11:
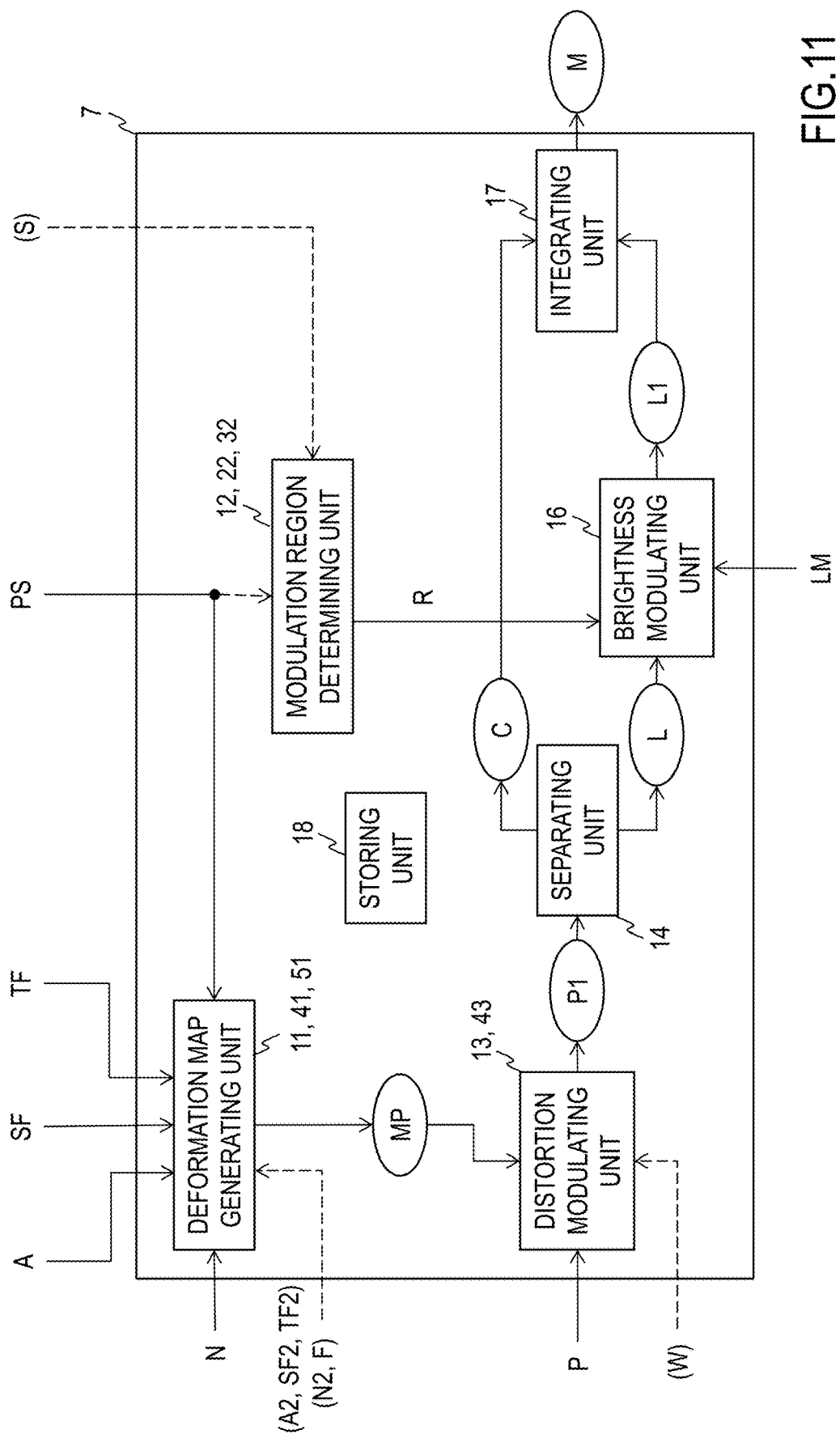
FIG. 11 is a block diagram showing an example of a functional configuration of the video generating device according to embodiments.

For example, as in a video generating device 7, which is shown as an example in FIG. 11, the color modulating unit 15 may be omitted from the video generating devices according to the first to fifth embodiments and variations thereof. In this case, only brightness modulation can be performed. That is to say, this video generating device 7, using the plurality of different deformation maps, moves the pixels deriving from the original image P in a moving direction by moving amount, the moving direction and the moving amount being specified by the elements corresponding to the respective pixels, obtains the plurality of modulated images P1, separates the plurality of modulated images P1 into brightness components and color components to obtain the plurality of brightness component images L and color component images C, obtains the plurality of brightness-modulated images L1, which are obtained by modulating the brightness of the plurality of brightness component images L in accordance with the brightness modulation information LM, and obtains a video M configured by temporally arranging a plurality of integrated images, which are obtained by integrating the brightness-modulated images L1 and the color component images C.

Various types of processing described above may be not only performed in time series following the description, but also performed in parallel or separately, depending on the performance of the device that performs processing, or as required. Needless to say, the present invention may be modified, as appropriate, within the scope of the gist thereof.

Each of the above-described devices is configured by a general-purpose computer or a dedicated computer that has, for example, a processor (hardware processor), such as a CPU (central processing unit), a memory such as a RAM (random-access memory) or a ROM (read-only memory), and so on, executing a predetermined program. This computer may include one processor and one memory, or may include a plurality of processors and memories. This program may be installed on the computer, or may be recorded, in advance, in the ROM or the like. Also, some or all of the processing units may be constituted by circuitry that realizes processing functions without using a program, rather than circuitry, such as a CPU, that realizes processing functions due to a program being loaded. Circuitry that constitutes one device may include a plurality of CPUs.

If the above-described configuration is realized by a computer, the content of processing of the functions that each device is to have is described by a program. The above processing functions are realized on the computer as a result of the computer executing this program. The program that describes this processing content can be recorded in a computer-readable recording medium. An example of a computer-readable recording medium is a non-transitory recording medium. Examples of such a recording medium include a magnetic recording device, an optical disk, a magneto-optical recording medium, a semiconductor memory, and the like.

This program is distributed by, for example, selling, transferring, or lending a portable recording medium, such as a DVD or a CD-ROM, in which the program is recorded. Furthermore, a configuration is also possible in which this program is stored in a storage device in a server computer, and is distributed by transferring the program from the server computer to other computers via a network.

For example, first, a computer that executes such a program temporarily stores, in its own storage device, the program recorded in the portable recording medium or the program transferred from the server computer. When performing processing, the computer loads the program stored in its own storage device, and performs processing in accordance with the loaded program. As another mode of executing this program, the computer may directly load the program from the portable recording medium and perform processing in accordance with the program, or may sequentially perform processing in accordance with a received program every time the program is transferred to this computer from the server computer. A configuration is also possible in which the above-described processing is performed through a so-called ASP (Application Service Provider) service that realizes processing functions only by giving instructions to execute the program and acquiring the results, without transferring the program to this computer from the server computer.

At least some of these processing functions of the device may be realized by hardware, rather than the processing functions being realized by causing a predetermined program to be executed on the computer.

REFERENCE SIGNS LIST 1 to 7 Video generating device

The invention claimed is:

1. A video generating device comprising processing circuitry configured to implement processing of:
   a distortion modulating unit that, using a plurality of different deformation maps that have elements corresponding to respective pixels deriving from an original image and have low-spatial frequency components, the elements indicating a moving direction and a moving amount of the corresponding pixels, moves the pixels deriving from the original image in a moving direction by a moving amount, the moving direction and the moving amount being specified by the elements corresponding to the respective pixels, to obtain a plurality of modulated images;
   a separating unit that separates the plurality of modulated images into brightness components and color components to obtain a plurality of brightness component images and color component images;
   a modulating unit that obtains a plurality of color-modulated images obtained by modulating color of the plurality of color component images in accordance with color modulation information; and
   an integrating unit that obtains a video configured by temporally arranging a plurality of integrated images obtained by integrating the brightness component images and the color-modulated images.

2. A video generating device comprising circuitry configured to implement processing of:
   a distortion modulating unit that, using a plurality of different deformation maps that have elements corresponding to respective pixels deriving from an original image and have low-spatial frequency components, the elements indicating a moving direction and a moving amount of the corresponding pixels, moves the pixels deriving from the original image in a moving direction by a moving amount, the moving direction and the moving amount being specified by the elements corresponding to the respective pixels, to obtain a plurality of modulated images;
   a separating unit that separates the plurality of modulated images into brightness components and color components to obtain a plurality of brightness component images and color component images;
   a modulating unit that obtains a plurality of brightness-modulated images obtained by modulating brightness of the plurality of brightness component images in accordance with brightness modulation information; and
   an integrating unit that obtains a video configured by temporally arranging a plurality of integrated images obtained by integrating the brightness-modulated images and the color component images.

3. A video generating device comprising circuitry configured to implement processing of:
   a distortion modulating unit that, using a plurality of different deformation maps that have elements corresponding to respective pixels deriving from an original image and have low-spatial frequency components, the elements indicating a moving direction and a moving amount of the corresponding pixels, moves the pixels deriving from the original image in a moving direction by a moving amount, the moving direction and the moving amount being specified by the elements corresponding to the respective pixels, to obtain a plurality of modulated images;

a separating unit that separates the plurality of modulated images into brightness components and color components to obtain a plurality of brightness component images and color component images;

a modulating unit that obtains a plurality of brightness-modulated images obtained by modulating brightness of the plurality of brightness component images in accordance with brightness modulation information, and obtains a plurality of color-modulated images obtained by modulating color of the plurality of color component images in accordance with color modulation information; and an integrating unit that obtains a video configured by temporally arranging a plurality of integrated images obtained by integrating the brightness-modulated images and the color-modulated images.

4. The video generating device according to claim 1, further comprising a deformation map generating unit that generates the deformation maps, wherein the plurality of different deformation maps indicate the moving direction and the moving amount of the pixels in a plurality of deformation regions, the plurality of deformation regions are obtained by deforming an outline of an original deformation region included in the original image, using a plurality of different second deformation maps having low-spatial frequency components, and the plurality of deformation regions have different outlines, and the deformation map generating unit modulates at least one of absolute values of spatial frequency components of the second deformation maps and an amplitude of the second deformation maps, in accordance with viscosity modulation information.

5. The video generating device according to claim 1, further comprising a deformation map generating unit that generates the deformation maps, wherein the plurality of different deformation maps indicate the moving direction and the moving amount of the pixels in a plurality of deformation regions, and the deformation map generating unit modulates sharpness of outlines of the plurality of deformation regions in accordance with viscosity modulation information.

6. The video generating device according to any of claims 1 to 3, wherein the deformation maps indicate a moving direction and a moving amount of the pixels belonging to a deformation region, and the modulating unit modulates color of the deformation region, or of the deformation region and a region around the deformation region, in the plurality of color component images to obtain the plurality of color-modulated images, and/or modulates brightness of the deformation region, or of the deformation region and the region around the deformation region, in the plurality of brightness component images to obtain the plurality of brightness-modulated images.

7. The video generating device according to claim 6, wherein the region around the deformation region is a region at an angle of view relative to the deformation region that is 0.12 degrees or less.

8. A video generating method for a video generating device, the method comprising:

a distortion modulating step of, using a plurality of different deformation maps that have elements corresponding to respective pixels deriving from an original image and have low-spatial frequency components, the elements indicating a moving direction and a moving amount of the corresponding pixels, moving the pixels deriving from the original image in a moving direction by a moving amount, the moving direction and the moving amount being specified by the elements corresponding to the respective pixels, to obtain a plurality of modulated images;

a separating step of separating the plurality of modulated images into brightness components and color components to obtain a plurality of brightness component images and color component images;

a modulating step of obtaining a plurality of color-modulated images obtained by modulating color of the plurality of color component images in accordance with color modulation information; and an integrating step of obtaining a video configured by temporally arranging a plurality of integrated images obtained by integrating the brightness component images and the color-modulated images.

9. A video generating method for a video generating device, the method comprising:

a distortion modulating step of, using a plurality of different deformation maps that have elements corresponding to respective pixels deriving from an original image and have low-spatial frequency components, the elements indicating a moving direction and a moving amount of the corresponding pixels, moving the pixels deriving from the original image in a moving direction by a moving amount, the moving direction and the moving amount being specified by the elements corresponding to the respective pixels, to obtain a plurality of modulated images;

a separating step of separating the plurality of modulated images into brightness components and color components to obtain a plurality of brightness component images and color component images;

a modulating step of obtaining a plurality of brightness-modulated images obtained by modulating brightness of the plurality of brightness component images in accordance with brightness modulation information; and an integrating step of obtaining a video configured by temporally arranging a plurality of integrated images obtained by integrating the brightness-modulated images and the color component images.

10. A video generating method for a video generating device, the method comprising:

a distortion modulating step of, using a plurality of different deformation maps that have elements corresponding to respective pixels deriving from an original image and have low-spatial frequency components, the elements indicating a moving direction and a moving amount of the corresponding pixels, moving the pixels deriving from the original image in a moving direction by a moving amount, the moving direction and the moving amount being specified by the elements corresponding to the respective pixels, to obtain a plurality of modulated images;

a separating step of separating the plurality of modulated images into brightness components and color components to obtain a plurality of brightness component images and color component images;

a modulating step of obtaining a plurality of brightness-modulated images obtained by modulating brightness of the plurality of brightness component images in accordance with brightness modulation information, and obtaining a plurality of color-modulated images obtained by modulating color of the plurality of color component images in accordance with color modulation information; and an integrating step of obtaining a video configured by temporally arranging a plurality of integrated images obtained by integrating the brightness-modulated images and the color-modulated images.

11. A non-transitory computer-readable recording medium storing a program for causing a computer to function as the video generating device according to any of claims 1 to 3.

* * * * *